US011775915B2

(12) United States Patent
Hou et al.

(10) Patent No.: US 11,775,915 B2
(45) Date of Patent: Oct. 3, 2023

(54) HUB-BASED DISTRIBUTION AND DELIVERY NETWORK FOR AUTONOMOUS TRUCKING SERVICES

(71) Applicant: TUSIMPLE, INC., San Diego, CA (US)

(72) Inventors: Xiaodi Hou, San Diego, CA (US); Jason Wallace, San Diego, CA (US); Cheng Lu, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 0 days.

(21) Appl. No.: 16/917,699

(22) Filed: Jun. 30, 2020

(65) Prior Publication Data

US 2021/0406810 A1 Dec. 30, 2021

(51) Int. Cl.
*G06Q 10/08* (2023.01)
*G06Q 10/083* (2023.01)

(52) U.S. Cl.
CPC .................. *G06Q 10/083* (2013.01)

(58) Field of Classification Search
CPC .............. G06Q 10/08; G06Q 10/083
See application file for complete search history.

(56) References Cited

U.S. PATENT DOCUMENTS

| D582,930 S | 12/2008 | Blankenship et al. |
|---|---|---|
| D716,825 S | 11/2014 | Bachman et al. |
| D717,321 S | 11/2014 | Lee |
| D718,780 S | 12/2014 | Rajaraman et al. |
| D737,309 S | 8/2015 | Kito et al. |
| D741,912 S | 10/2015 | Gomez |
| D753,158 S | 4/2016 | Mezzanotte |
| D754,711 S | 4/2016 | Herold et al. |
| D759,081 S | 6/2016 | Yu et al. |
| D829,733 S | 10/2018 | Clapper et al. |
| 10,093,526 B2 * | 10/2018 | D'Andrea ............... B66F 9/063 |
| D834,602 S | 11/2018 | Bao |
| D839,302 S | 1/2019 | Lu et al. |

(Continued)

OTHER PUBLICATIONS

"L. Lynch, T. Newe, J. Clifford, J. Coleman, J. Walsh and D. Toal, Automated Ground Vehicle (AGV) and Sensor Technologies—A Review, 2018 12th International Conference on Sensing Technology (ICST), Limerick, Ireland, 2018, pp. 347-352, doi: 10.1109/ICSensT.2018.8603640." (Year: 2018).*

(Continued)

*Primary Examiner* — Daniel Vetter
*Assistant Examiner* — Christopher Gomez
(74) *Attorney, Agent, or Firm* — Paul Liu; Glen Theodore Mathews; Perkins Coie LLP

(57) ABSTRACT

Systems and techniques disclosed in this patent document provide novel and efficient ground transportation of goods by self-driving trucks based on a system of infrastructures with shipping hub facilities serving as warehouses and services centers in accordance with unique characteristics of operating autonomous self-driving trucks without entirely relying on human drivers, including features to cover technological issues, fleet management issues, and customer service issues. In addition, the disclosed systems and techniques may be implemented to integrate other fleet services and modes of transportation of goods with transportation services by self-driving trucks.

17 Claims, 24 Drawing Sheets

(56) References Cited

U.S. PATENT DOCUMENTS

| | | | |
|---|---|---|---|
| D888,742 S | 6/2020 | Leong et al. | |
| D924,913 S | 7/2021 | Bragdon | |
| D959,452 S | 8/2022 | Mishima et al. | |
| D959,458 S | 8/2022 | Tertzakian | |
| 2007/0048084 A1* | 3/2007 | Jung | G09F 9/35 |
| | | | 404/9 |
| 2012/0173448 A1* | 7/2012 | Rademaker | G06Q 50/28 |
| | | | 705/338 |
| 2015/0006005 A1* | 1/2015 | Yu | G06Q 50/28 |
| | | | 701/22 |
| 2018/0024554 A1* | 1/2018 | Brady | G05D 1/0088 |
| | | | 701/23 |
| 2019/0066041 A1 | 2/2019 | Hance | |
| 2019/0333390 A1* | 10/2019 | Woodrow | G05D 1/0088 |
| 2020/0103882 A1* | 4/2020 | Sullivan | B66F 9/063 |
| 2020/0130893 A1* | 4/2020 | Vain | B65D 43/22 |
| 2021/0081624 A1* | 3/2021 | Kovarik | G06K 7/10376 |
| 2021/0166297 A1* | 6/2021 | Mattingly | G06Q 10/087 |

OTHER PUBLICATIONS

Weidmann, Matthias. European Application No. 21182616.9-1222, Extended European Search Report dated Oct. 26, 2021, pp. 1-10.

* cited by examiner

TuSimple Connect System

TuSimple Connect System

401 — register self-driving trucks to be eligible for delivery of goods between the shipping hub facilities to comply with selected safety and operational requirements in a computer database stored in one or more computer servers that communicate with one another via one or more communication networks or links

402 — track status of goods at the shipping hub facilities including feeding facility-specific high-definition map information and navigation data to on-board computers in registered self-driving trucks for navigating registered self-driving trucks on one or more selected and designated routes between shipping hub facilities

403 — communicate with on-board computers in registered self-driving trucks to track and manage status and operations of registered self-driving trucks for delivering goods between the hub facilities and to detect or identify one or more conditions of a registered self-driving truck suitable for being serviced or repaired at one of suitable shipping hub facilities

404 — track inventory status of goods for registered customers at one or more shipping hub facilities for delivery from one shipping hub facility to another

405 — provide a customer interface for registered customers to access the computer system for (i) ordering, tracking and making payment for, a delivery service by one or more self-driving trucks to transport goods from one shipping hub facility to another, and (ii) accessing inventory status of goods for registered customers at one or more shipping hub facilities for delivery from one shipping hub facility to another

FIG. 4

TuSimple Connect System

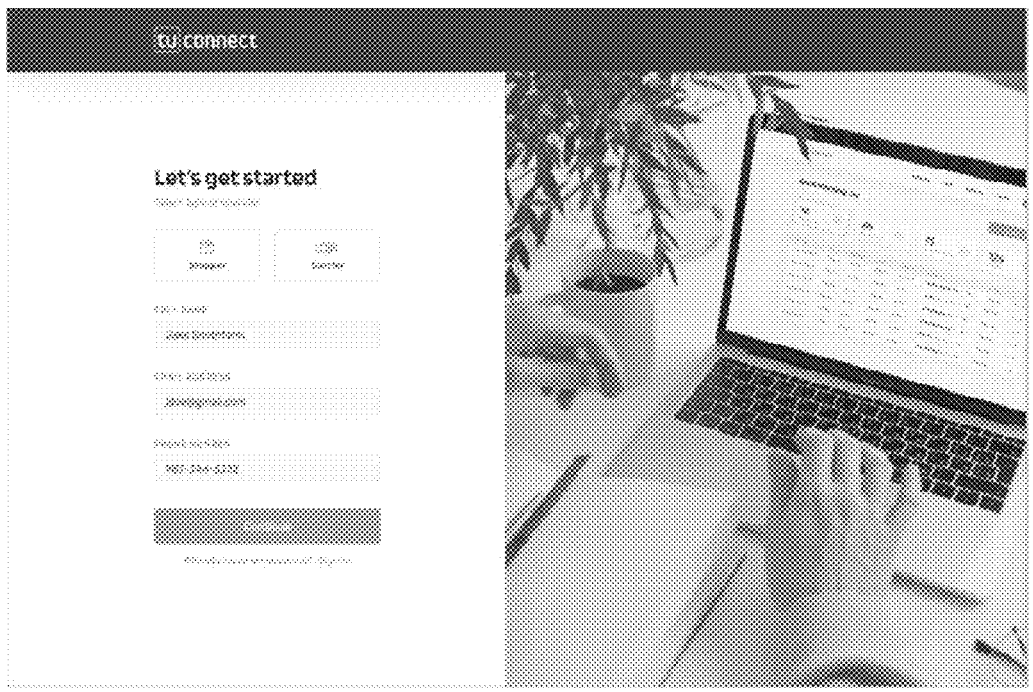
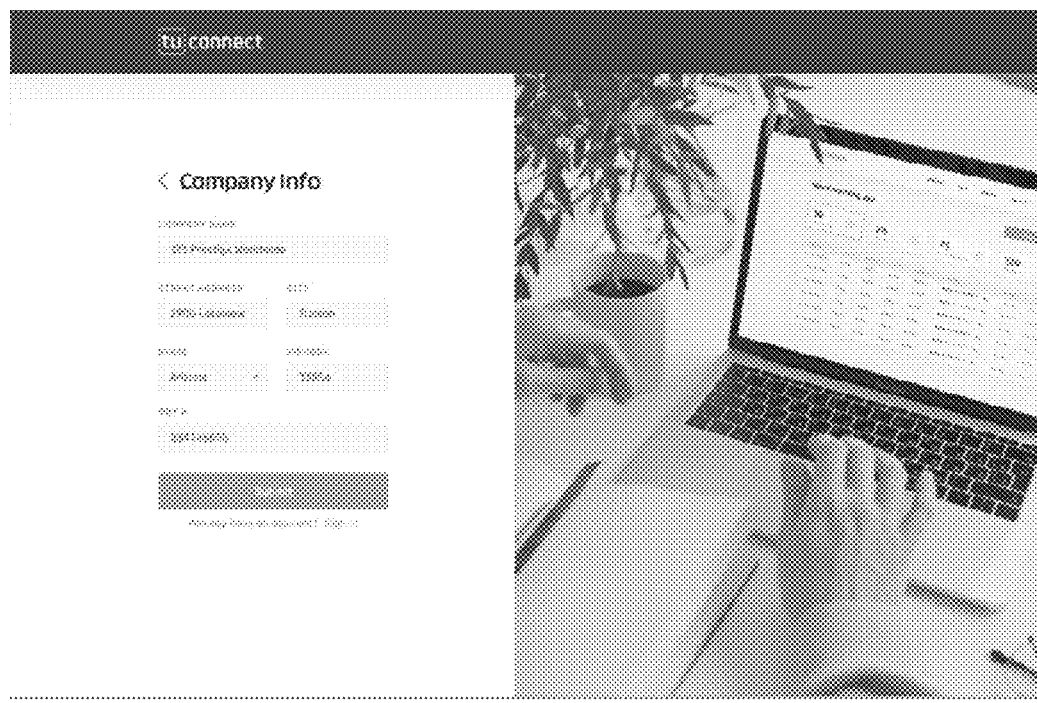
FIG. 5B
TuSimple Connect System-
Shipper and Carrier UI Page TuSimple Connect System-
Shipper Estimation Page TuSimple Connect System TuSimple Connect System

TuSimple Connect System

TuSimple Connect System

TuSimple Connect System

TuSimple Connect-Shipper Billing & Payment

FIG. 8H
TuSimple Connect-User Management Pages

TuSimple Connect System–Administrator

TuSimple Connect System-Administrator

TuSimple Connect System-Administrator

FIG. 9D
TuSimple Connect System

TuSimple Connect System

FIG. 10
TuSimple Connect-Administrator-Hub and Route Creation

TuSimple Connect-Administrator-Managing Companies

HUB-BASED DISTRIBUTION AND DELIVERY NETWORK FOR AUTONOMOUS TRUCKING SERVICES

TECHNICAL FIELD

This patent document relates to goods distribution and delivery services using autonomous self-driving vehicles and associated management features for such services.

BACKGROUND

Ground transportation of goods by trucks is essential to commerce. In some circumstances, the ground transportation of goods by trucks provides the entire transportation of certain goods from start to end, and in other circumstances, and the ground transportation of goods by trucks plays an important role in in connection with, and supplements or completes, ground transportation of goods by trains and railroad systems, air transportation by aircraft and transportation over water by ships.

Various truck delivery services are based on operations of trucks driven by human drivers and are structured and managed based on characteristics of trucking services associated with involvement of human drivers.

SUMMARY

Truck delivery services using autonomous self-driving vehicles such as autonomous self-driving freight trucks present new and unique technological issues, fleet management issues, and customer service issues that are not encountered in freight trucking services based on freight trucks driven by human drivers. Accordingly, truck delivery services using autonomous self-driving vehicles demand new solutions to the technological issues, fleet management issues, and customer service issues.

Systems and techniques disclosed in this patent document provide novel and efficient ground transportation of goods by self-driving trucks based on a system of infrastructures with shipping hub facilities serving as warehouses and services centers in accordance with unique characteristics of operating autonomous self-driving trucks without entirely relying on human drivers, including features to cover technological issues, fleet management issues, and customer service issues. In addition, the disclosed systems and techniques may be implemented to integrate other fleet services and modes of transportation of goods with transportation services by self-driving trucks.

In one aspect, the disclosed systems and techniques can be implemented to provide a method for using self-driving trucks and shipping hub facilities to provide a delivery service in a selected geographical region. The method includes establishing shipping hub facilities distributed at different locations in the selected geographical region to provide delivery of goods to customers in the selected geographical region, wherein each shipping hub facility includes a warehouse space for storing customer goods to be delivered to another shipping hub facilities; and providing a computer system of computer servers coupled to one or more communication networks or links to (1) communicate with one another to maintain, monitor and track status of goods at the shipping hub facilities including feeding facility-specific high-definition map information and navigation data to on-board computers in self-driving trucks for navigating self-driving trucks on one or more selected and designated routes between shipping hub facilities, (2) communicate with on-board computers in self-driving trucks registered in the computer system to monitor, track and manage status and operations of registered self-driving trucks for delivering goods between the shipping hub facilities and to detect or identify one or more conditions of a registered self-driving truck suitable for being serviced or repaired at one of suitable shipping hub facilities, and (3) provide a customer interface for registered customers to access the computer system for (i) ordering, tracking and making payment for, a delivery service by one or more self-driving trucks to transport goods from one shipping hub facility to another, and (ii) accessing inventory status of goods for registered customers at one or more shipping hub facilities for delivery from one shipping hub facility to another. The status of each self-driving truck registered in the computer system includes a location in real time and a health condition of each registered self-driving truck and a status of a delivery assignment of the registered self-driving truck, and the operations of registered self-driving trucks for delivering goods between the hub facilities include information on one or more assignments of each registered self-driving truck for performing one or more customer ordered deliveries, and scheduling of the one or more assignments of each registered self-driving truck for performing one or more customer ordered deliveries.

In another aspect, the disclosed systems and techniques can be implemented to provide a computer readable medium system having code stored thereon, the code, when executed by one or more computer processors, causing the one or more computer processors to implement functions for operating self-driving trucks to provide a delivery service in a selected geographical region having shipping hub facilities distributed at different locations to provide delivery of goods to customers for the delivery service in the selected geographical region. Each shipping hub facility includes a warehouse space for storing customer goods to be delivered to another shipping hub facility. The implemented functions include: registering self-driving trucks to be eligible for delivery of goods between the shipping hub facilities to comply with selected safety and operational requirements in a computer database stored in one or more computer servers that communicate with one another via one or more communication networks or links; tracking status of goods at the shipping hub facilities including feeding facility-specific high-definition map information and navigation data to on-board computers in registered self-driving trucks for navigating registered self-driving trucks on one or more selected and designated routes between shipping hub facilities; communicating with on-board computers in registered self-driving trucks to track and manage status and operations of registered self-driving trucks for delivering goods between the hub facilities and to detect or identify one or more conditions of a registered self-driving truck suitable for being serviced or repaired at one of suitable shipping hub facilities; and providing a customer interface for registered customers to access the computer system for (i) ordering, tracking and making payment for, a delivery service by one or more self-driving trucks to transport goods from one shipping hub facility to another, and (ii) accessing inventory status of goods for registered customers at one or more shipping hub facilities for delivery from one shipping hub facility to another.

These, and other, aspects and their implementations are described in greater detail in the description, the drawings and the claims of this document.

BRIEF DESCRIPTION OF DRAWINGS

FIG. 4 is a flowchart of an example of an operation of the network of shipping hub facilities in FIG. 1A.

FIGS. 5A-11 show examples of various features of software and operations of the network of shipping hub facilities in FIG. 1A including user interfaces for customers and administrators of TuSimple Connect.

DETAILED DESCRIPTION

Figure 1A:
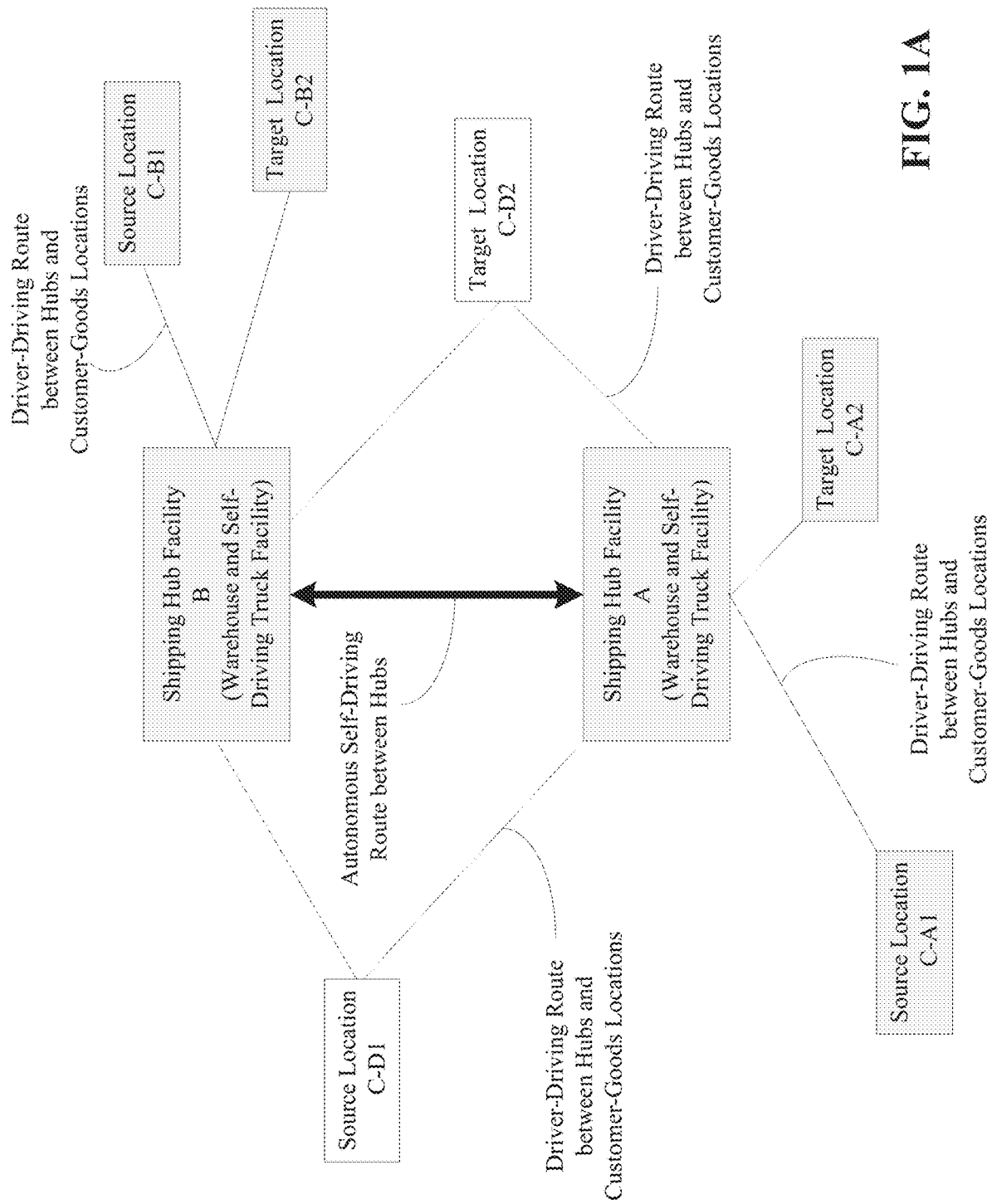
FIGS. 1A-C show an example of a network of shipping hub facilities developed by TuSimple and a software system "TuSimple Connect" that monitors, tracks and manages autonomous self-driving trucks for transporting goods between shipping hub facilities, interfaces with customers for their shipping needs and carriers that participate TuSimple Connect shipment in connection with TuSimple's autonomous self-driving delivery services and manages internal logistics for running the autonomous self-driving delivery service and participating carriers.

Autonomous self-driving vehicles such as autonomous self-driving freight trucks developed by TuSimple, Inc. (https://www.tusimple.com/) can be operated autonomously without manual steering, control and operations by human drivers. Such autonomous self-driving vehicles or freight trucks are equipped with on-board sensors (e.g., sensors based on radar, lidar, cameras, vehicle to vehicle sensors and others) to monitor the road conditions and surroundings and are controlled by artificial intelligence vehicle control and operating algorithms via on-board computers (and remote computers) in near real-time based on sensor signals from the on-board sensors and other data to navigate through the traffic to desired destinations. Autonomous self-driving vehicles including autonomous self-driving freight trucks may be designed to meet various standards for different applications, including, for example, SAE levels for autonomous vehicles by SAE International. For fully autonomous self-driving vehicles such as TuSimple's commercial-ready SAE Level 4 fully autonomous long-haul heavy-duty trucks capable of autonomous operations on highways and surface streets without human intervention, a human operator is generally not involved in the normal operation and driving of the autonomous self-driving freight trucks. In some circumstances, human operators may not be present in autonomous self-driving vehicles or freight trucks and the trucks are entirely operated by on-board computers in communication with other remote computers. In some other circumstances, human operators such as drivers or engineers may be on board in autonomous self-driving vehicles or freight trucks to either provide human intervention to take over the control and driving in certain rare circumstances or perform non-driving functions or tasks. Fully autonomous self-driving vehicles may be driven and operated by a human driver in certain circumstances or on certain roads where fully autonomous self driving may not suitable or desirable and may resume full autonomous self driving when the vehicle is out of such undesired circumstance or road. By largely elimination or significant reduction of laborious manual driving based on human drivers' physical abilities before reaching fatigue conditions, and individual judgement and decision making based on human drivers' levels of training and driving experience, truck delivery services using autonomous self-driving vehicles enable longer operating time of autonomous self-driving freight trucks on road, higher delivery volumes of transported goods in comparison with human-operated trucking services, improved safety by reducing human driver errors and mistakes, and more efficient management of fleets of autonomous self-driving freight trucks and customer delivery services. Those and other advantages and benefits of truck delivery services using autonomous self-driving vehicles may be achieved in part by addressing technological issues, fleet management issues, and customer service issues associated with truck delivery using autonomous self-driving vehicles.

TuSimple Inc. has developed both (1) technologies, software and hardware for building autonomous self-driving vehicles and (2) systems and techniques to manage technological issues, fleet management issues, and customer service issues associated with truck delivery using autonomous self-driving vehicles. The TuSimple's systems and techniques in (2) are applicable to truck delivery services and fleet management based on autonomous self-driving vehicles for transporting goods for customers that use autonomous self-driving vehicles developed not only by TuSimple Inc. but also by others.

TuSimple's systems and techniques to manage truck delivery using autonomous self-driving vehicles are based on a network of shipping hub facilities as origination locations of certain outgoing customer goods to be delivered to other shipping hub facilities and as destinations for receiving certain incoming customer goods from other shipping hub facilities. In addition, such shipping hub facilities are used to receive, from customers, customer goods to be delivered and to relinquish or handover received customer goods from other shipping hub facilities to recipients of the received customer goods. In such a network of shipping hub facilities, at least part of the network of shipping hub facilities may be designed to include local services centers for servicing, repairing and inspecting autonomous self-driving trucks to ensure the safety and fitness of autonomous self-driving trucks. The locations of shipping hub facilities are selected so that the conditions of the roads connecting the shipping hub facilities are surveyed and the data regarding such roads are timely updated to meet applicable safety standards for operating autonomous self-driving trucks such as the TuSimple's SAE Level 4 freight trucks. The transportation between the shipping hub facilities is generally by autonomous self-driving trucks with little or minimum human intervention under normal operating conditions. Human operators, such as one or more drivers and/or engineers, may be on board to take over the control and driving in certain rare circumstances or perform non-driving functions or tasks such as uploading or off loading goods at a shipping hub facility.

This network of shipping hub facilities is operated and managed via a TuSimple's software system, "TuSimple Connect," that monitors, tracks and manages autonomous self-driving trucks for transporting goods between shipping hub facilities, interfaces with customers for their shipping needs and carriers that participate TuSimple Connect shipment in connection with TuSimple's autonomous self-driving delivery services and manages internal logistics behind TuSimple Connect for running the autonomous self-driving delivery services and participating carriers.

In implementations, the TuSimple Connect software platform can be supported by a computer system of computer servers coupled to one or more communication networks or links to (1) communicate with one another to maintain, monitor and track status of goods at the trucking or shipping hub facilities including feeding facility-specific high-definition map information and navigation data to on-board computers in self-driving trucks for navigating self-driving trucks on one or more selected and designated routes between shipping hub facilities, (2) communicate with onboard computers in self-driving trucks registered in the computer system to monitor, track and manage status and operations of registered self-driving trucks for delivering goods between the shipping hub facilities and to detect or identify one or more conditions of a registered self-driving truck suitable for being serviced or repaired at one of suitable shipping hub facilities, and (3) provide a customer interface for registered customers to access the computer system for (i) ordering, tracking and making payment for, a delivery service by one or more self-driving trucks to transport goods from one shipping hub facility to another, and (ii) accessing inventory status of goods for registered customers at one or more shipping hub facilities for delivery from one shipping hub facility to another.

Shipping Hub Facilities for TuSimple Connect

FIG. 1A shows an example of a portion of a network of shipping hub facilities as origination locations of certain outgoing customer goods to be delivered to other shipping hub facilities and as destinations for receiving certain incoming customer goods from other shipping hub facilities. Two shipping hub facilities A and B are illustrated as examples for a network of shipping hub facilities serving a region such as within one or multiples states in the U.S. or many regions such as entire southern states of the U. S. or the nationwide service in all states within the continental U.S. The locations of the shipping hub facilities (e.g., A and B) are selected based on customer locations (e.g., being close to or convenient to transport goods to or from customer locations or locations of their goods) and locations of roadways or highways selected by TuSimple for providing truck delivery using autonomous self-driving vehicles. The conditions of the roads connecting the shipping hub facilities A and B are surveyed and the data regarding such roads are timely updated to meet applicable safety standards for operating autonomous self-driving trucks such as the TuSimple's SAE Level 4 freight trucks. The transportation of goods between the hub facilities A and B are, as a default of TuSimple Connect, is by truck delivery using autonomous self-driving vehicles. FIG. 1A annotates each of the roadways between A and B as "Autonomous Self-Driving Route between Hubs" and TuSimple Connect may be implemented to operate based on this autonomous driving nature of the routes between A and B in managing the autonomous driving truck resources.

Each shipping hub facility in for TuSimple Connect is both (1) an origination location of certain outgoing customer goods to be delivered to other shipping hub facilities and (2) a destination for receiving certain incoming customer goods from other shipping hub facilities to be delivered. Referring to the example in FIG. 1A, the shipping hub facility A is located to be near a source location C-A1 from which customer goods are located and to be stored at the shipping hub facility A for being delivered to another shipping hub facility such as B. In the illustrated example in FIG. 1A, the transportation of goods between the source location C-A1 and the shipping hub facility A may be generally via trucks driven by human drivers as indicated by a dotted line and, accordingly, TuSimple Connect may be implemented to operate based on this manual driving by human drivers of the routes between A and the source location C-A1 and thus to manage the autonomous driving truck resources by only allocating autonomous driving trucks between hub facilities A and B and not allocating autonomous driving trucks between A and C-A1. In other implementation examples, truck delivery using autonomous self-driving vehicles may also be implemented along a dotted line route when its road condition is suitable for autonomous driving and the data of the road is made available and updated.

In the example in FIG. 1A, the shipping hub facility A is also shown to be located near a target or destination location C-A2 at which customer goods received at the shipping hub facility A for being delivered to another shipping hub facility such as B. Similarly for the shipping hub facility A, examples of source location C-B1 and target location C-B2 associated with shipping hub facility B are shown, which are similar to locations C-A1 and C-A2 for the shipping hub facility A.

Figure 1B:
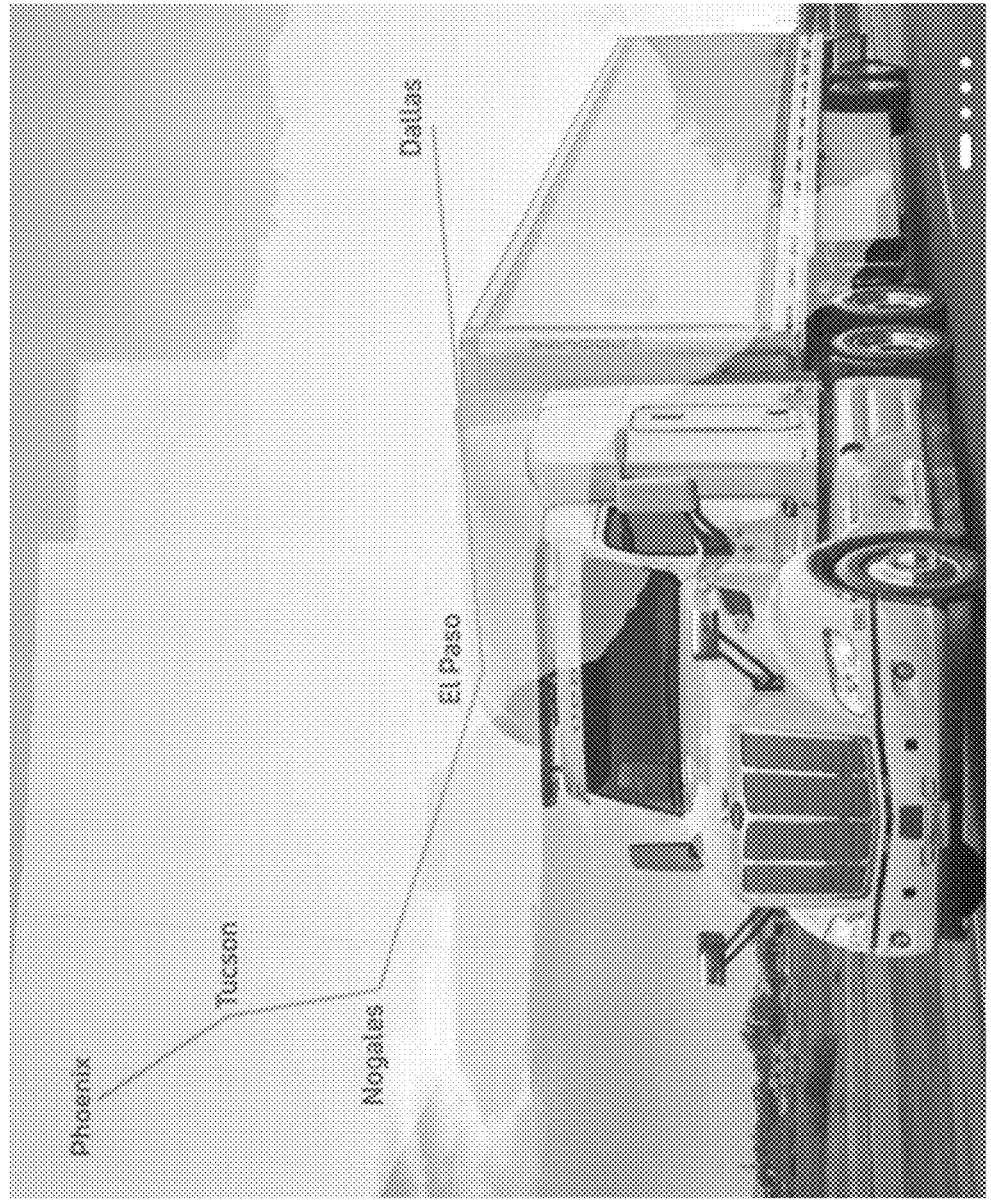

FIG. 1B shows an example for implementing the hub infrastructure in FIG. 1A as a regional network of shipping hub facilities for TuSimple Connect at cities of Phoenix, Tucson and Nogales in Arizona, and cities of El Paso and Dallas in Texas. Customers' needs for transporting goods at or near those regional or national network of shipping hub facilities can be met access to TuSimple Connect and customers may arrange to drop off or pick up their goods at desired shipping hub facilities. TuSimple Connect manages the transportation of goods between shipping hub facilities and may also, in certain circumstances, manage transportation of goods between other locations and a shipping hub facility. This combination of the network of shipping hub facilities, autonomous self-driving trucks such as the TuSimple's SAE Level 4 freight trucks and access and management via TuSimple Connect enables commercial deployment of efficient and timely transportation beyond the capacities and level of services rendered via traditional truck delivery services. In addition, TuSimple's regional or/and national network of shipping hub facilities may be integrated with rail systems, cargo airports and shipping ports to fully integrate with transportation systems by land, by air and by water to meet versatile needs for transportation of goods at both regional and national levels.

In operation, TuSimple Connect allows a customer to look up availability of service areas by TuSimple's network of shipping hub facilities and select a suitable or desired origination shipping hub facility for the customer to provide its goods to be delivered and to select a suitable or desired destination shipping hub facility to which the goods are to be delivered. Once the customer requests the service on TuSimple Connect, the customer can access its account on TuSimple Connect for various customer facing functions, including monitoring and tracking the delivery status and making payments. More detailed on those functions are provided below.

The shipping hub facilities are designed for storing customer goods and are used to receive, from customers, customer goods to be delivered (e.g., the shipping hub facility A and the source location C-A1) and to relinquish or handover received customer goods from other shipping hub facilities to recipients of the received customer goods (e.g., the shipping hub facility B and the target location C-B2). In such a network of shipping hub facilities, at least part of the network of shipping hub facilities can be designed to include local services centers for servicing, repairing and inspecting autonomous self-driving trucks to ensure the safety and fitness of autonomous self-driving trucks that are used for serving customers of TuSimple Connect and to comply with applicable safety rules and regulations governing services provided by TuSimple Connect. For example, TuSimple Connect can be configured to mandate a pre-assignment inspection protocol for safety prior to assigning an autonomous self-driving truck to a delivery between hub facilities and only a truck satisfactorily passes the safety inspection may be available for being assigned to a delivery. A truck that fails to pass the safety inspection is flagged in TuSimple Connect and is rejected for being assigned for customer deliveries. In addition, such a truck is required by TuSimple Connect to (1) be serviced or repaired at the local shipping hub facility or another shipping hub facility with a services center and (2) subsequently pass the safety inspection prior to becoming eligible for making deliveries. Each customer's request for transporting goods between two shipping hub facilities is entirely generated, managed, and tracked via TuSimple Connect and a truck for transporting customer's goods is registered in TuSimple Connect and is selected and scheduled to dispatch for a delivery, and is further managed and tracked during the entire delivery process. Accordingly, TuSimple Connect can be designed to implement the safety inspection protocol as a mandatory requirement for each truck to be eligible for making deliveries and this mandatory requirement can be enforced by TuSimple and via local management at a shipping hub facility. This safety feature in TuSimple Connect substantially eliminates safety violations by individual drivers or personnel in traditional fleet management for transportation of goods.

The shipping hub facilities for TuSimple Connect may be designed with various features. By way of example, the following sections describe three levels of complexity of shipping hub facilities: Tier 1 shipping hub facilities, Tier 2 shipping hub facilities and Tier 3 shipping hub facilities with Tier 1 shipping hub facilities being the most complex in terms of implemented technologies, capabilities and functions, Tier 2 being the medium complex and Tier 3 being the simplest.

A Tier 1 shipping hub facility may include a warehousing section for storing customer goods, a vehicle garage for parking autonomous self-driving trucks, a truck service center for inspecting, maintaining and repairing trucks and having fuel pumps for refueling trucks and electrical charging stations for charging electrical trucks, one or more truck weigh scales, separate entry/exit truck lanes for in-bound autonomous self-driving trucks and out-bound autonomous self-driving trucks that are equipped with markers and sensors to allow auto-navigation of autonomous self-driving trucks in such entry/exit truck lanes, launch pads at exit truck lanes to allow automated loading customer goods onto out-bound autonomous self-driving trucks, and landing pads at entry truck lanes to allow automated off loading customer goods from in-bound autonomous self-driving trucks. A Tier 1 shipping hub facility may also include optical character recognition capacity to allow for automatic acquisition of information from in-bound and out-bound autonomous self-driving trucks. Those and other sensors at a Tier 1 shipping hub facility are linked to provide data to on-board computers of autonomous self-driving trucks and other computers that support TuSimple Connect. In addition, a Tier 1 shipping hub facility may further include one or more hub computers that are in communication with on-board computers on trucks and other computers for supporting TuSimple Connect. Furthermore, a Tier 1 shipping hub facility provides local facility engineering and service personnel for maintaining and operating the facility.

Therefore, a Tier 1 shipping hub facility is a "smart" facility that enables a significant level of machine to machine communications (e.g., communications between (1) local facility sensors, markers and computers and (2) sensors and on-board computers of a truck and allows for autonomous operations for handling goods and managing autonomous self-driving trucks. Such a Tier 1 shipping hub facility may be deployed in some the busiest locations with high customer demands and high shipping volumes.

A Tier 2 shipping hub facility is generally less complex than a Tier 1 shipping hub facility and may include a warehousing section for storing customer goods, a vehicle garage for parking autonomous self-driving trucks, and a truck service center for inspecting, maintaining and repairing trucks. A Tier 2 shipping hub facility may further include fuel pumps for refueling trucks and electrical charging stations for charging electrical trucks. Furthermore, a Tier 2 shipping hub facility provides some local engineering and service personnel for maintaining and operating the facility. Such a Tier 1 shipping hub facility may be deployed in moderately busy locations with moderate customer demands and moderate shipping volumes.

A Tier 3 shipping hub facility is more barebone and less equipped than a Tier 2 shipping hub facility and may include a small warehousing section for storing customer goods, and a small vehicle garage for parking autonomous self-driving trucks. In addition, it may include a simple truck service center for inspecting, maintaining, and repairing trucks, generally for simple repairing. Furthermore, a Tier 2 shipping hub facility provides some local engineering and service personnel for maintaining and operating the facility. Such a Tier 3 shipping hub facility may be deployed in least busy locations with low but sufficient customer demands and lower shipping volumes than those of a Tier 2 shipping hub facility.

The network of shipping hub facilities for TuSimple Connect may be designed to include a mixture of Tiers 1, 2 and 3 facilities of different levels of implemented technologies, capacities and functions based on local shipping volumes and customer demands to balance the costs for deploying those facilities and efficient operations of the overall network to meet customers' demands.

The combined features of TuSimple's network of shipping hub facilities and TuSimple Connect provides unique advantages and benefits for delivery of goods by deploying autonomous self-driving trucks and may be used as a transportation and service platform to interface and/or supplement delivery by other delivery services such as traditional fleets of human-driven trucks, railroad systems, cargo airplanes and ships over oceans, rivers and lakes. TuSimple's network of shipping hub facilities may be extended to be on premise at or near warehousing facilities for traditional fleets of human-driven trucks, railroad systems, cargo airplanes (e.g., Los Angeles International Airport or Memphis International Airport) and shipping ports (e.g., the Port of Long Beach or Port of Seattle-Tacoma) to enhance efficiency and timeliness of those traditional services for transportation of goods.

Figure 1C:
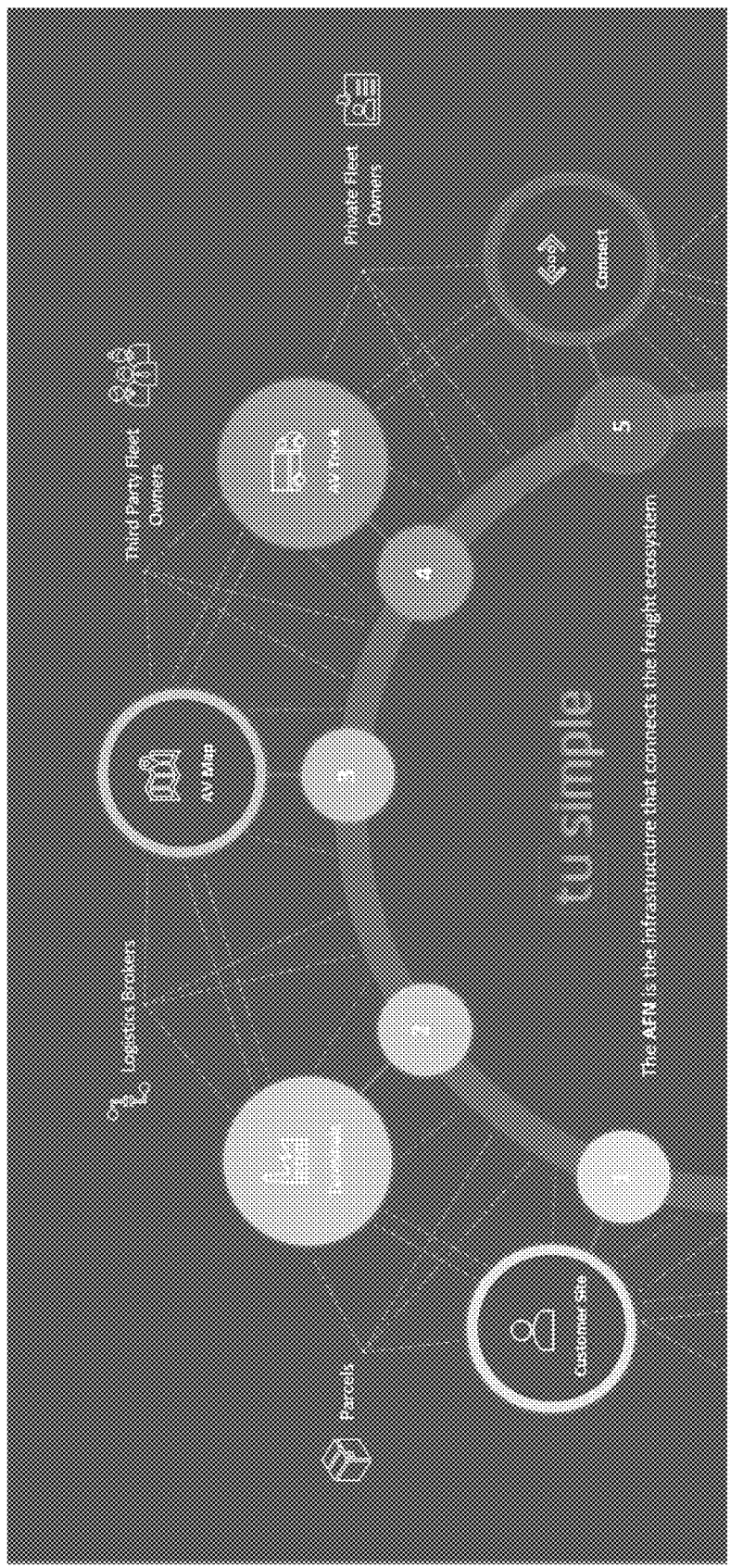

As a specific example, FIG. 1C illustrates how a network of shipping hub facilities and TuSimple Connect may be used to work with other fleets of trucking services to enable shipping hub facilities for TuSimple Connect to work with other trucking services and to support delivery services by other trucking services via TuSimple Connect platform in terms of managing their fleets, managing customers and supplementing delivery of other fleets using human-driven trucks with truck delivery using autonomous self-driving vehicles between shipping hub facilities. As illustrated in FIG. 1C, other third party trucking services (e.g., a fleet with driver-operated trucks) may register their freight trucks at TuSimple Connect and use TuSimple Connect to manage their delivery services to their customers by having their customers access the customer interface functions on TuSimple Connect to request and purchase delivery services. Once registered at TuSimple Connect, a third party fleet may also, via TuSimple Connect, to use available TuSimple's self driving trucks to provide a hub-to-hub transportation of goods and may use its driver-operated trucks to provide delivery beyond the TuSimple shipping hub facilities in TuSimple Connect. Likewise, TuSimple may also use such a third party's extra truck capacity to serve the needs of TuSimple customers to supplement TuSimple's availability of TuSimple's self driving trucks for hub-to-hub transportation and/or for transportation of goods to other customer desired locations beyond the existing shipping hub facilities.

Examples of Computers and Communication Devices for TuSimple Connect

Figure 2:
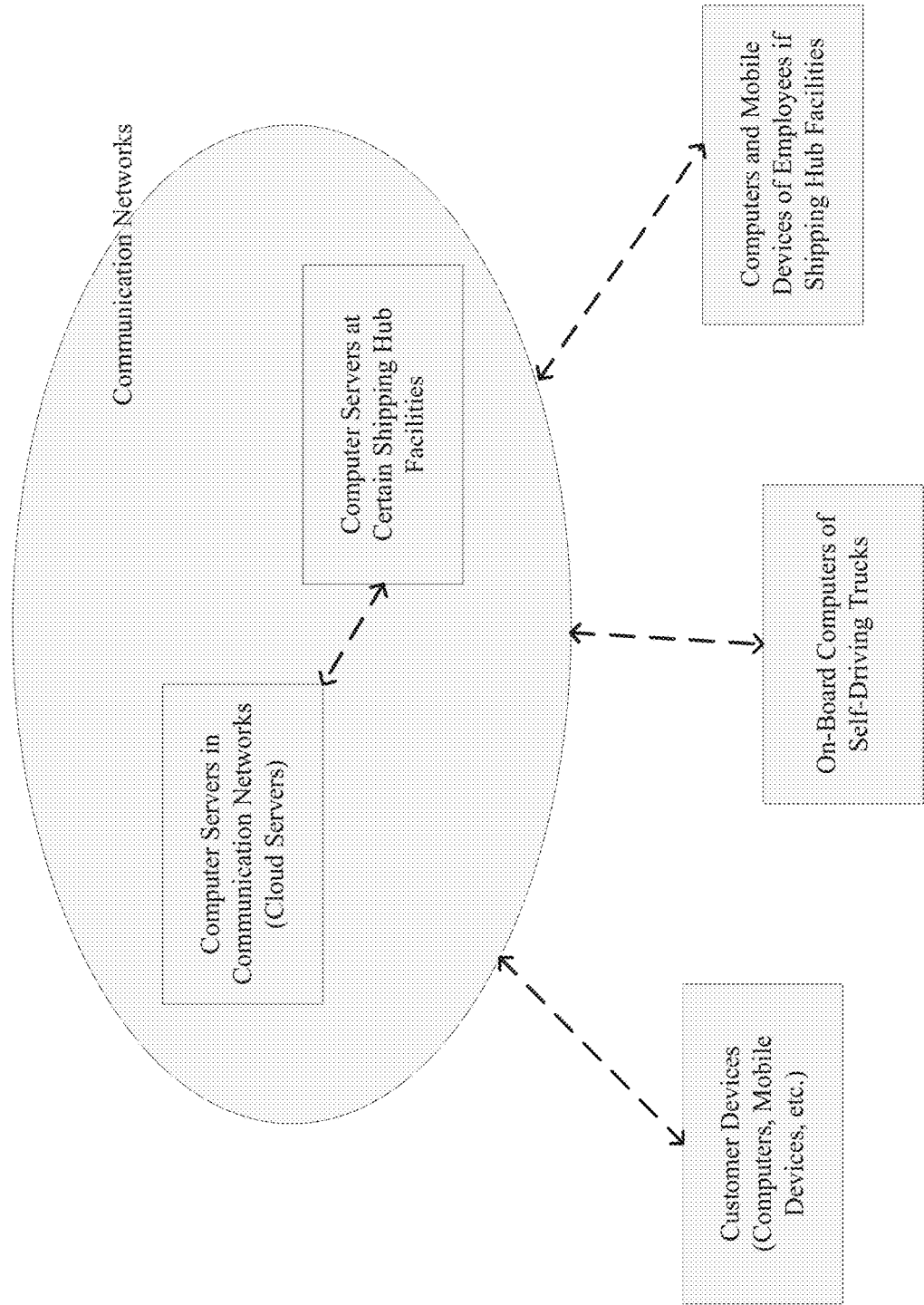
FIG. 2 shows an example of computers and devices of a computer system for supporting software and operations of the network of shipping hub facilities in FIG. 1A.

TuSimple Connect for managing customers for truck delivery and operating a network of shipping hub facilities to execute truck delivery using autonomous self-driving vehicles are based on a network of computers or computer servers to enable (1) monitoring and tracking status and operations of trucks including autonomous self-driving vehicles and other trucks registered to TuSimple Connect; (2) monitoring and tracking status and operations of shipping hub facilities; and (3) interfacing with customers and managing customer delivery services including customer registration, tracking customer delivery and customer payments. FIG. 2 shows an example of some identified computers of the network of computers or computer servers for TuSimple Connect (1) on-board computers of self-driving trucks, (2) computer servers in one or more communication networks for supporting TuSimple Connect, (3) computer servers at certain shipping hub facilities such as a Tier 1 shipping hub facility, (4) computers and/or mobile devices of employees working at shipping hub facilities, and (5) computing or communication devices by customers of TuSimple Connect. Computers or devices in (2) and (3) provide the backbone for TuSimple Connect to interact with on-board computers on trucks in (1) and computers and devices by TuSimple workers in (4) and to support the interactions with customer devices in (5).

Figure 3:
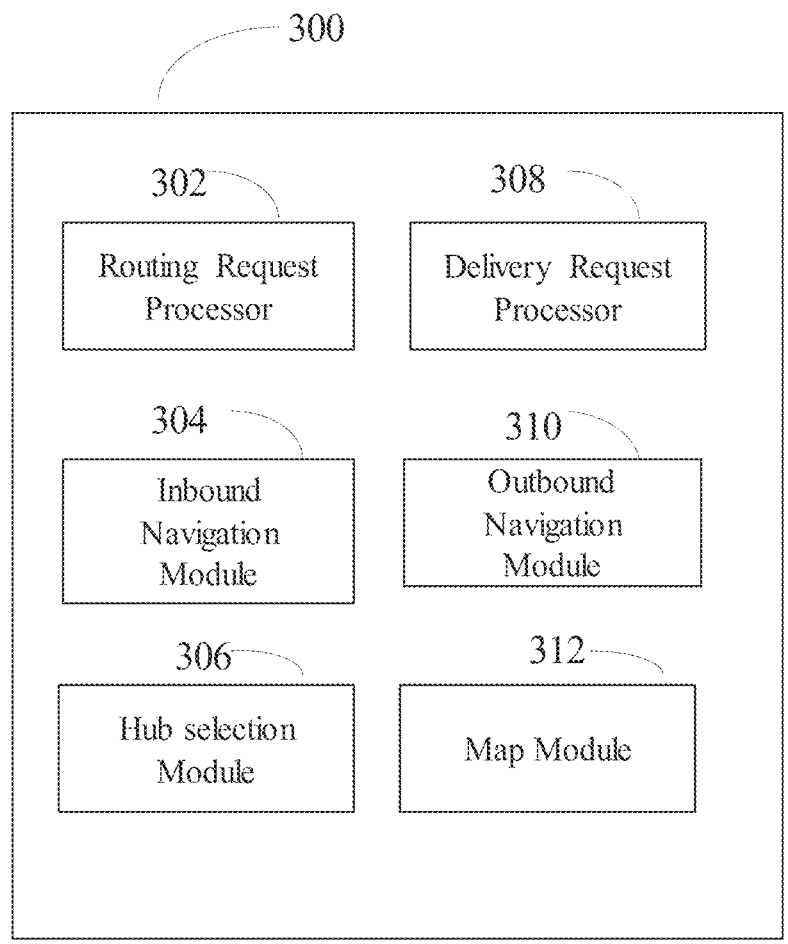
FIG. 3 shows an example of software or hardware modules for the computer system in FIG. 2.

FIG. 3 shows an example of various computing or processing modules in a system 300 based on the computers and devices in (2)-(4) in FIG. 2 to enable various functions of TuSimple Connect. The various modules described herein may be implemented in software, or a combination of software and hardware. In some embodiments, each module may be implemented on a distributed computing platform or a cloud based computing platform.

Routing Request Processor Module 302

This function may be configured to receiving routing requests in the network. The routing request may include a source location or address, a destination location or address. The routing request may include further parameters associated with the routing, such as, a priority of the request, a value of the content to be routed, a time constraint for the delivery, and so on.

Inbound navigation module 304

The inbound navigation module 304 analyzes content delivery requests and determines a mode by which the content is brought into the core network from its origination point.

Hub Selection Module 306

This module may analyze all inbound traffic and decide which specific hub to assign the traffic to.

Map Module 312

This module remembers topology of the delivery route between hubs. The information includes time invariant information and time variant information. Time invariant information includes information that may not change over a period of time that is greater than the delivery time of the content. For example, in autonomous driving situation, the delivery may occur in one to two days, and road topology that does not change over months or years may be considered time invariant. By contrast, road conditions, vehicle positions and any temporary detours may be considered time variant conditions.

Outbound Navigation Module 310

This module may perform the function of deciding a routing and delivery mechanism for content received over the core distribution network and determine an optical delivery method between the target hub at which content is received and the destination to which the content is to be delivered.

Delivery Request Processor 308

Delivery request processor 308 decides delivery scheduling, both at the source hub and at the target hub.

Examples of Delivery Workflow Via TuSimple Connect

In some embodiments, one or more content sources in a source group may request delivery of corresponding packages. Multiple such routing requests may be accumulated for scheduling delivery. Source groups may be identified where each group may represent sources from which delivery is made to a regional hub using a shared delivery method.

Referring back to FIG. 1A, depending on the source groups and sources, at least two hubs are identified—a first hub (Hub A) that is near the source groups and a second hub (Hub B) that is near the target or destination groups.

FIG. 4 is an example of a flowchart for operating TuSimple Connect to manage the hub system in FIG. 1A for making deliveries between hubs based on self-driving trucks. At 401, self-driving trucks are registered to be eligible for delivery of goods between the shipping hub facilities to comply with selected safety and operational requirements in a computer database stored in one or more computer servers that communicate with one another via one or more communication networks or links. Next at 402, the status of goods at the shipping hub facilities is tracked and facility-specific high-definition map information and navigation data are provided to on-board computers in registered self-driving trucks for navigating registered self-driving trucks on one or more selected and designated routes between shipping hub facilities. At 403, the computer servers for TuSimple Connect are operated to communicate with on-board computers in registered self-driving trucks to track and manage status and operations of registered self-driving trucks for delivering goods between the hub facilities and to detect or identify one or more conditions of a registered self-driving truck suitable for being serviced or repaired at one of suitable shipping hub facilities. At 404, the computer servers for TuSimple Connect are operated to track inventory status of goods for registered customers at one or more shipping hub facilities for delivery from one shipping hub facility to another. At 405, the computer servers for TuSimple Connect are operated to provide a customer interface for registered customers to access the computer system for (i) ordering, tracking and making payment for, a delivery service by one or more self-driving trucks to transport goods from one shipping hub facility to another, and (ii) accessing inventory status of goods for registered customers at one or more shipping hub facilities for delivery from one shipping hub facility to another.

Figure 5A:
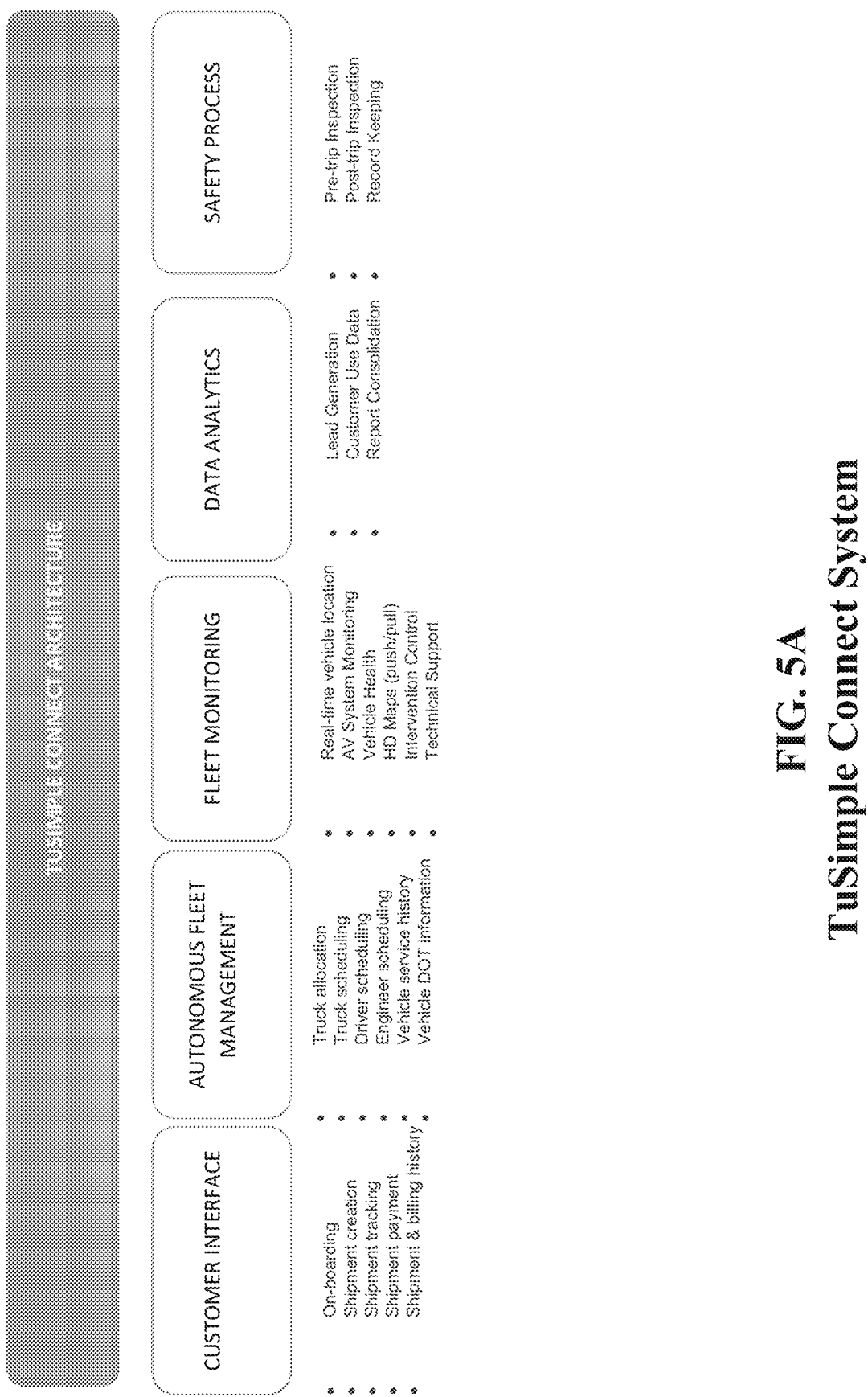

FIG. 5A shows an example of various function modules of TuSimple Connect in one implementation: (1) a customer interface for registering for service, ordering a service, tracking and monitoring an ordered service and managing payments and customer account; (2) an autonomous fleet management module for managing trucks to perform customer ordered services including, e.g., real-time truck allocation, truck scheduling, driver scheduling (if needed), engineer scheduling (if needed), truck service history record, and truck's Department of Transportation (DOT) number for commercial operation; (3) a fleet monitoring module for monitoring and tracking a truck including, e.g., truck location, audio-video (AV) system monitoring for AV feeds from the truck, truck health parameters, high-definition maps, intervention control, and technical support; (4) a customer data analytics module for collecting, analyzing and managing customer data to provide improved responses to customer needs and enhanced services to customers; and (5) a safety process module that implements and mandates the above-described truck safety inspection protocol for ensuring the safe operations of vehicles.

Figure 5C:
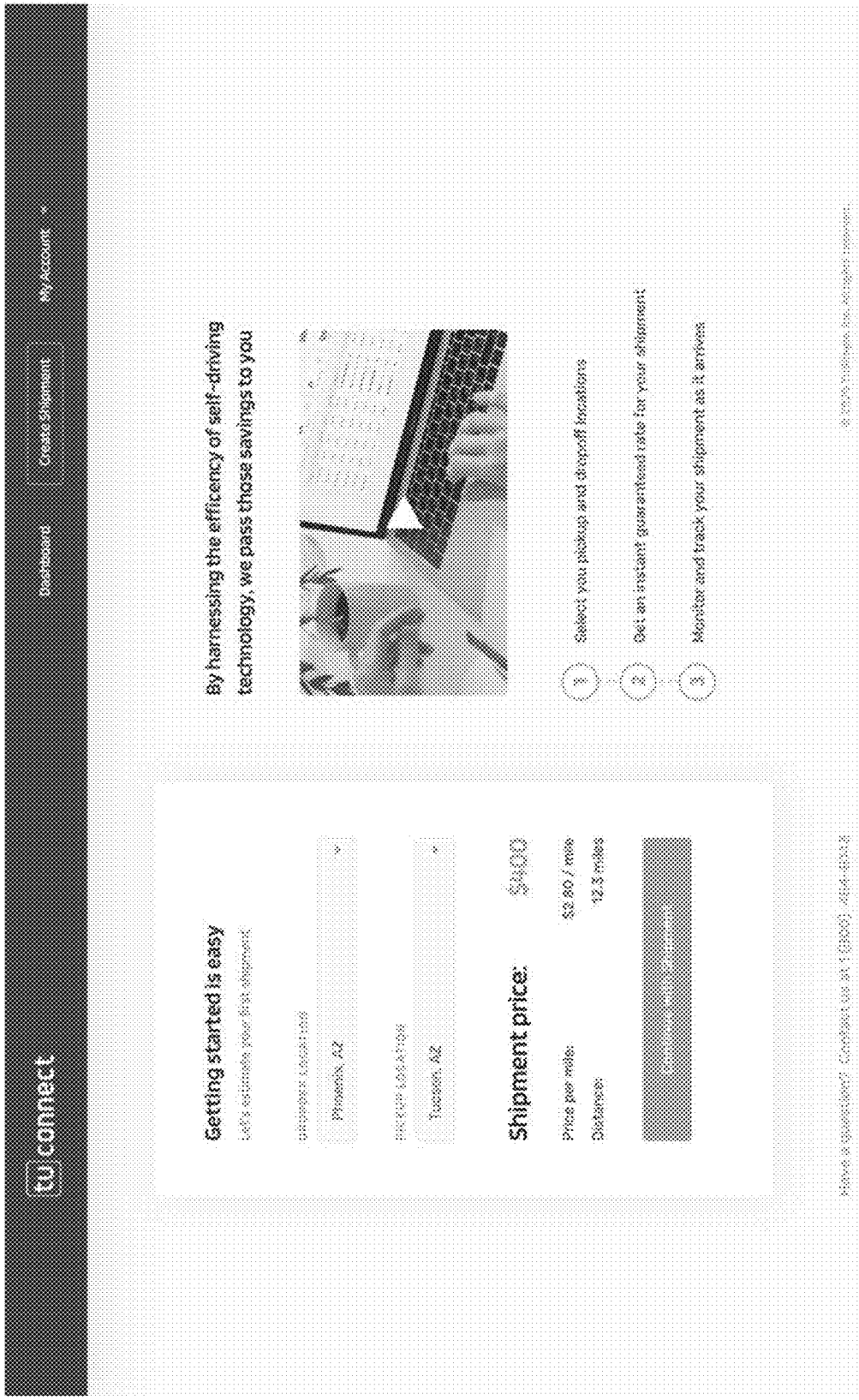

FIG. 5B shows an example of user registration pages on TuSimple Connect for a customer for shipping services or a carrier for providing trucks (and drivers) to participate the TuSimple Connect services to serve its customers or to supplement TuSimple's autonomous trucking shipping services. FIG. 5C further shows a user page for a customer to estimate the cost of a shipment.

Examples of Customer Interface and Functions

In some implementations, the customer interface for the TuSimple Connect can be configured for registered customers to provide to a registered customer data and information on customer history for deliver requests, orders and payment history. In some implementations, the customer interface for TuSimple Connect can be configured to provide to a registered customer a notification of a delivery ordered by the registered customer. In some implementations, the customer interface may be configured to provide to a registered customer an image or video of a self-driving truck en route to a designated shipping hub facility for delivering goods in a delivery ordered by the registered customer. The examples of the user interface pages provided below can be implemented via a web application or a mobile application.

Figure 6:
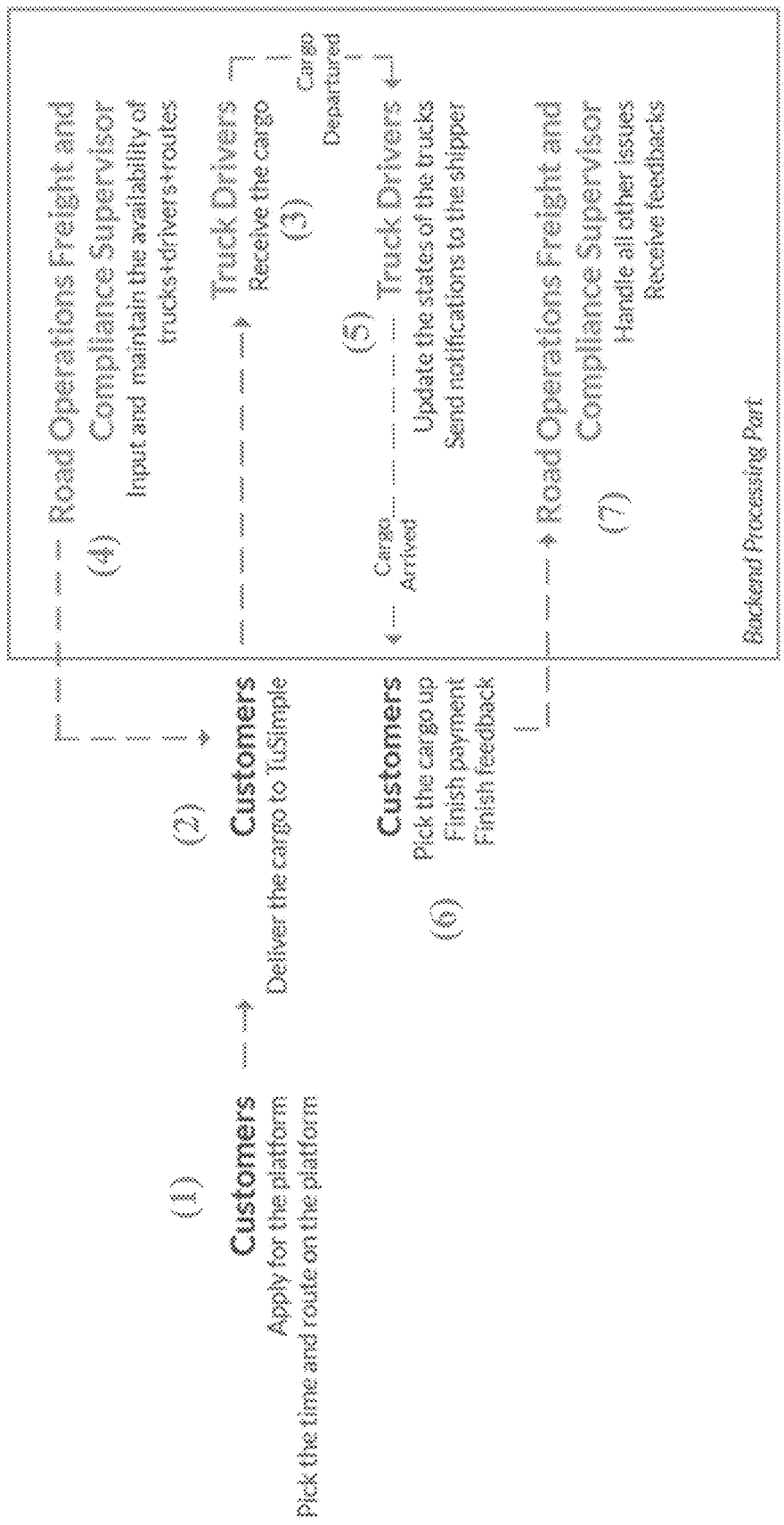

FIG. 6 further shows an example of certain customer interactions with TuSimple Connect in using the hubs for delivering customer goods: (1) a customer opens a customer account via the customer interface on TuSimple Connect and places a shipment order between two shipping hub facilities; (2) the registered customer arranges customer goods or cargo(s) to be delivered to the customer-selected origination shipping hub facility; (3) the facility personnel at the origination shipping hub facility completes the in-take of the customer goods or cargo(s) for delivery to a customer-selected destination shipping hub facility; (4) the TuSimple Connect fleet management personnel/software module ("road operations freight and compliance supervisor") schedules an eligible truck (passing the safety inspection protocol), schedules a driver/engineer if needed, and dispatches the truck; (5) TuSimple Connect tracks and provides the status of the delivery and the truck for internal monitoring and tracking and for providing status update and notification to the customer; (6) the registered customer arranges pick-up or reception of the customer goods or cargo(s) that have been delivered to the customer-selected destination shipping hub facility; and (7) the TuSimple Connect fleet management personnel/software module ("road operations freight and compliance supervisor") processes post-delivery operations, including customer feedback, post-delivery review of vehicle operation and safety inspection for new delivery assignments.

Figure 7:
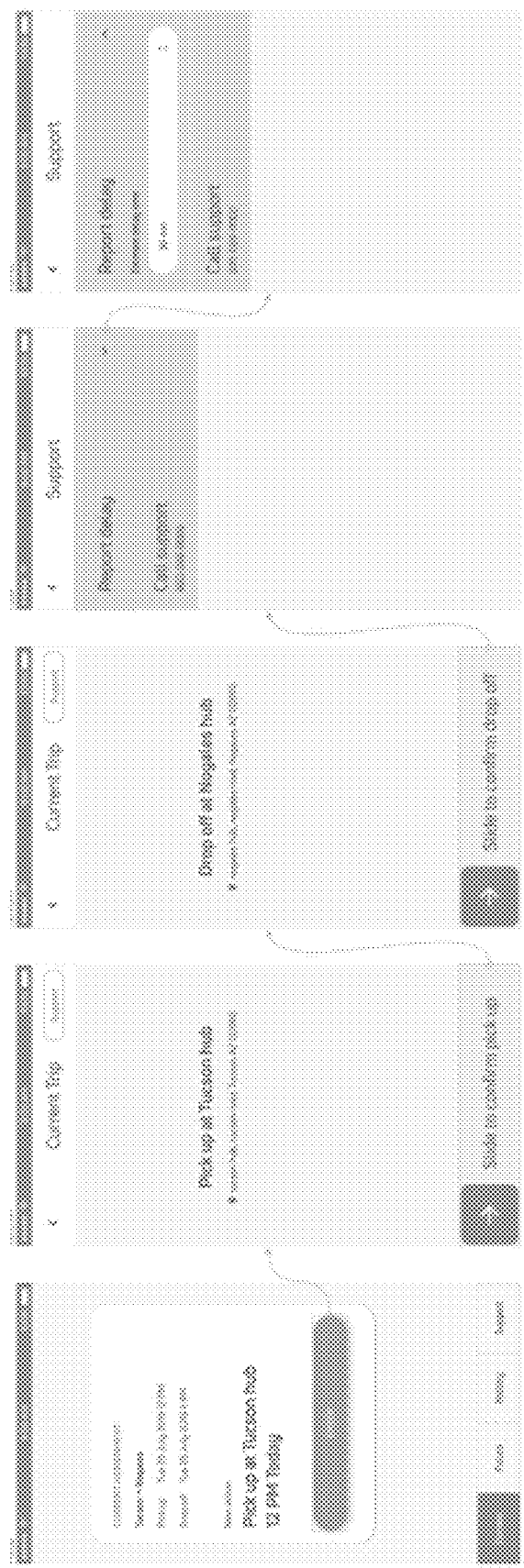

FIG. 7 shows an example of some of customer user interface pages for a customer of a delivery service on TuSimple Connect. TuSimple Connect is designed to support access via mobile app, desktop app or web access. The examples UI pages in FIG. 7 show customer made selecting origination and destination shipping hub facilities via TuSimple Connect, scheduling the delivery and report any delays for customer drop off and pick up.

Figure 8A:
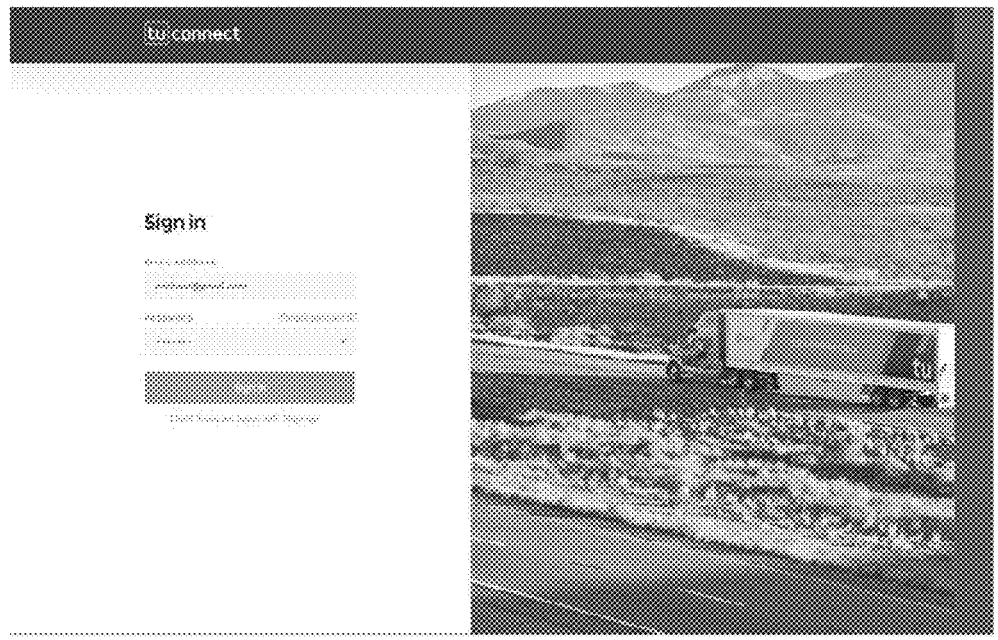
Figure 8B:
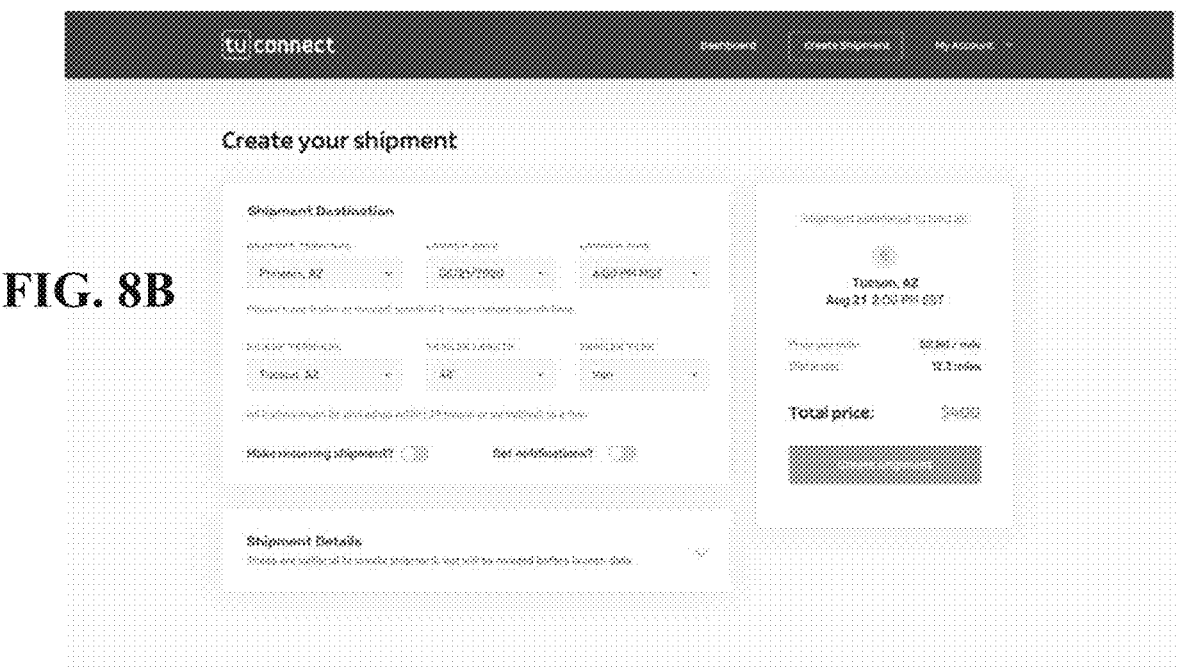
Figure 8C:
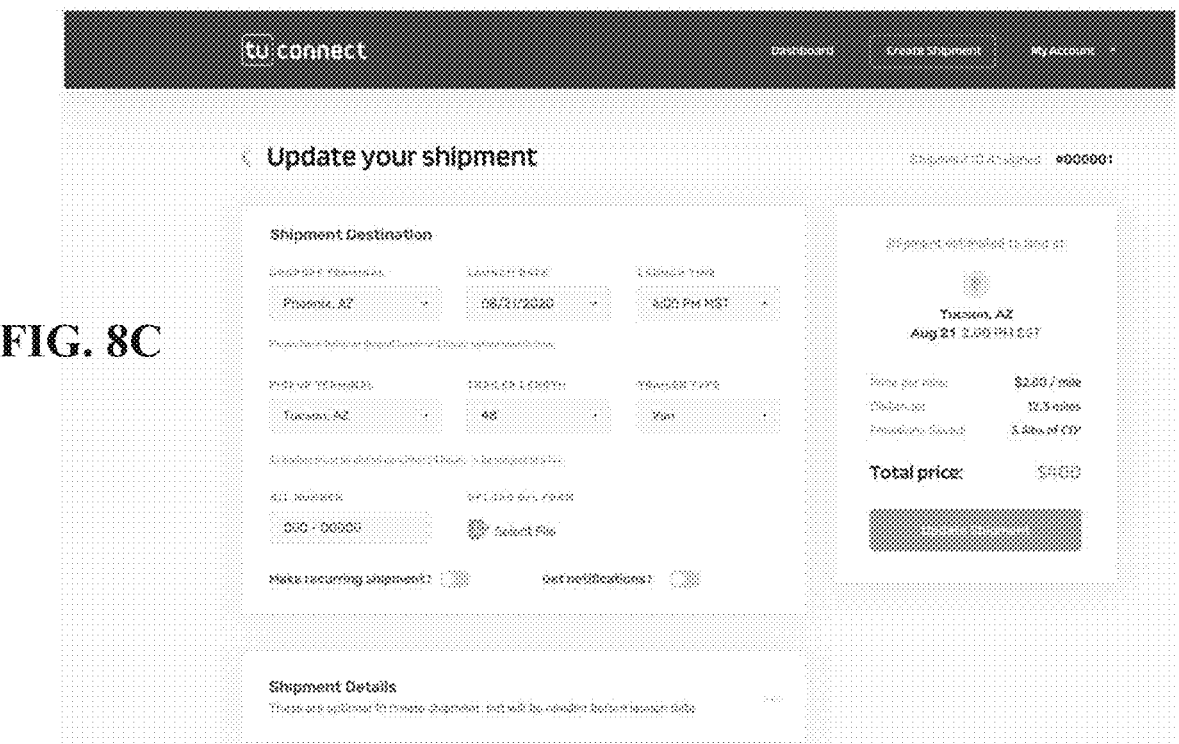
Figure 8D:
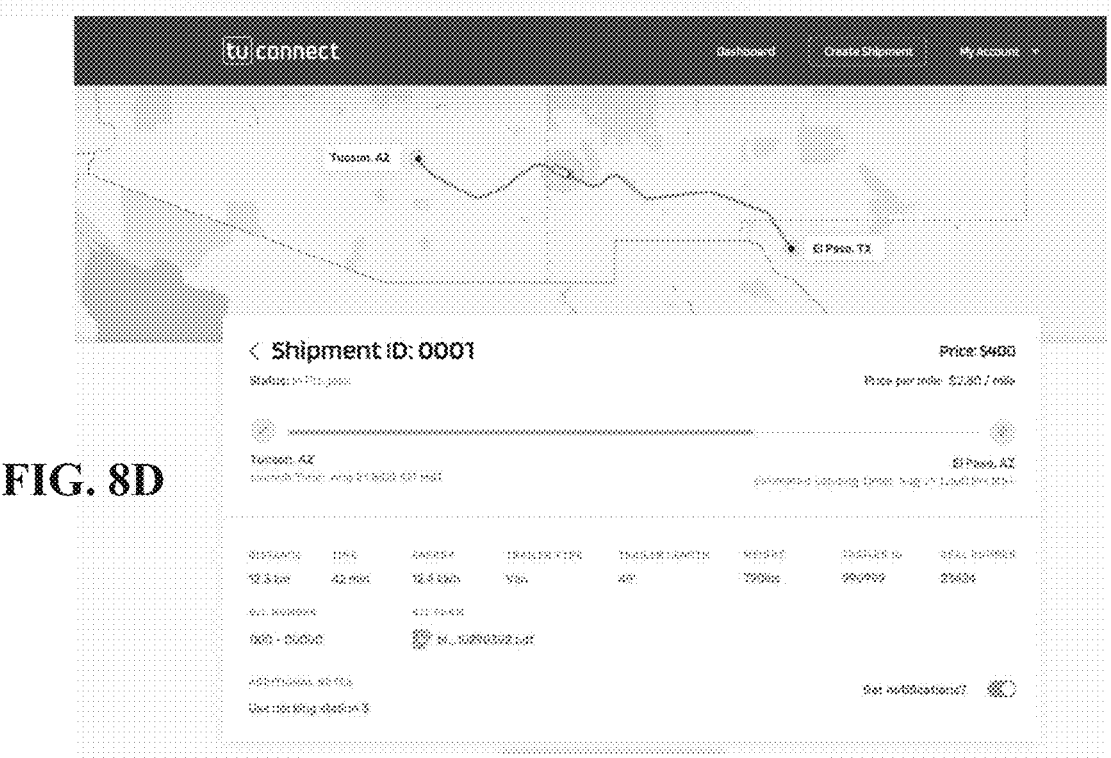
Figure 8E:
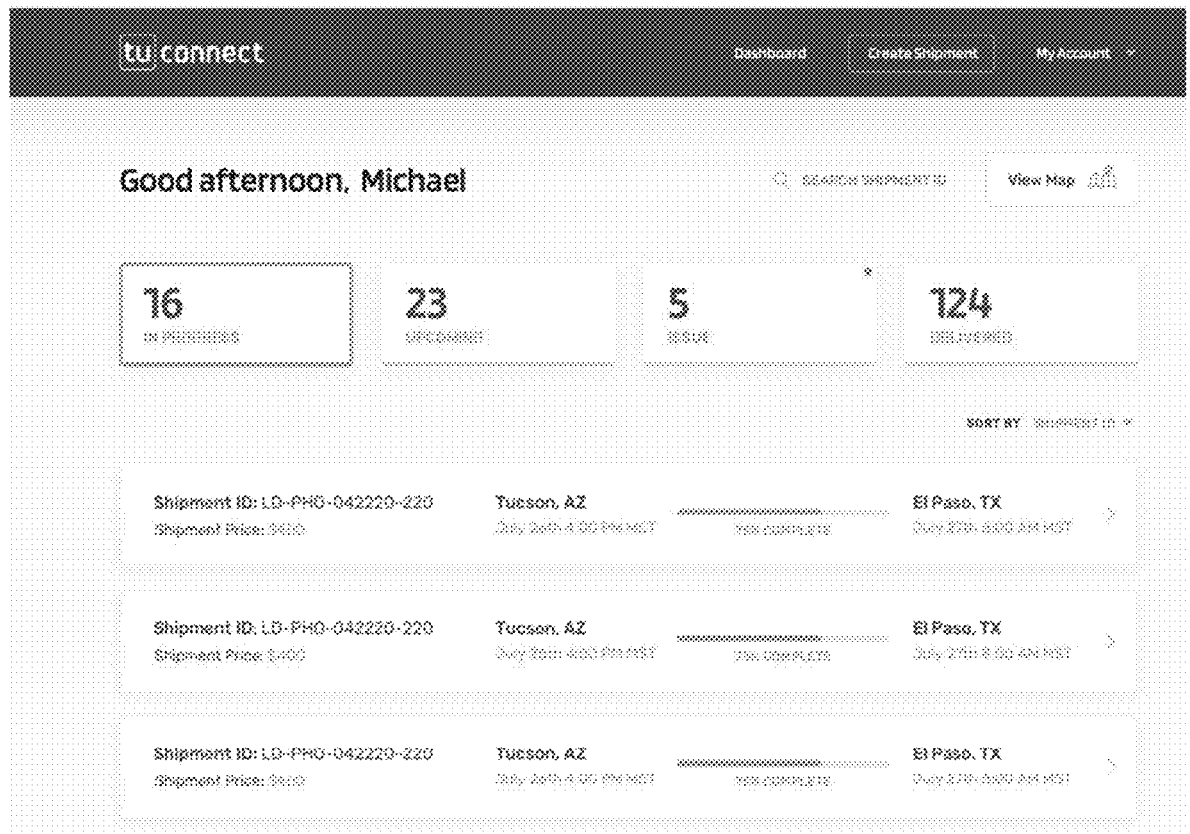
Figure 8F:
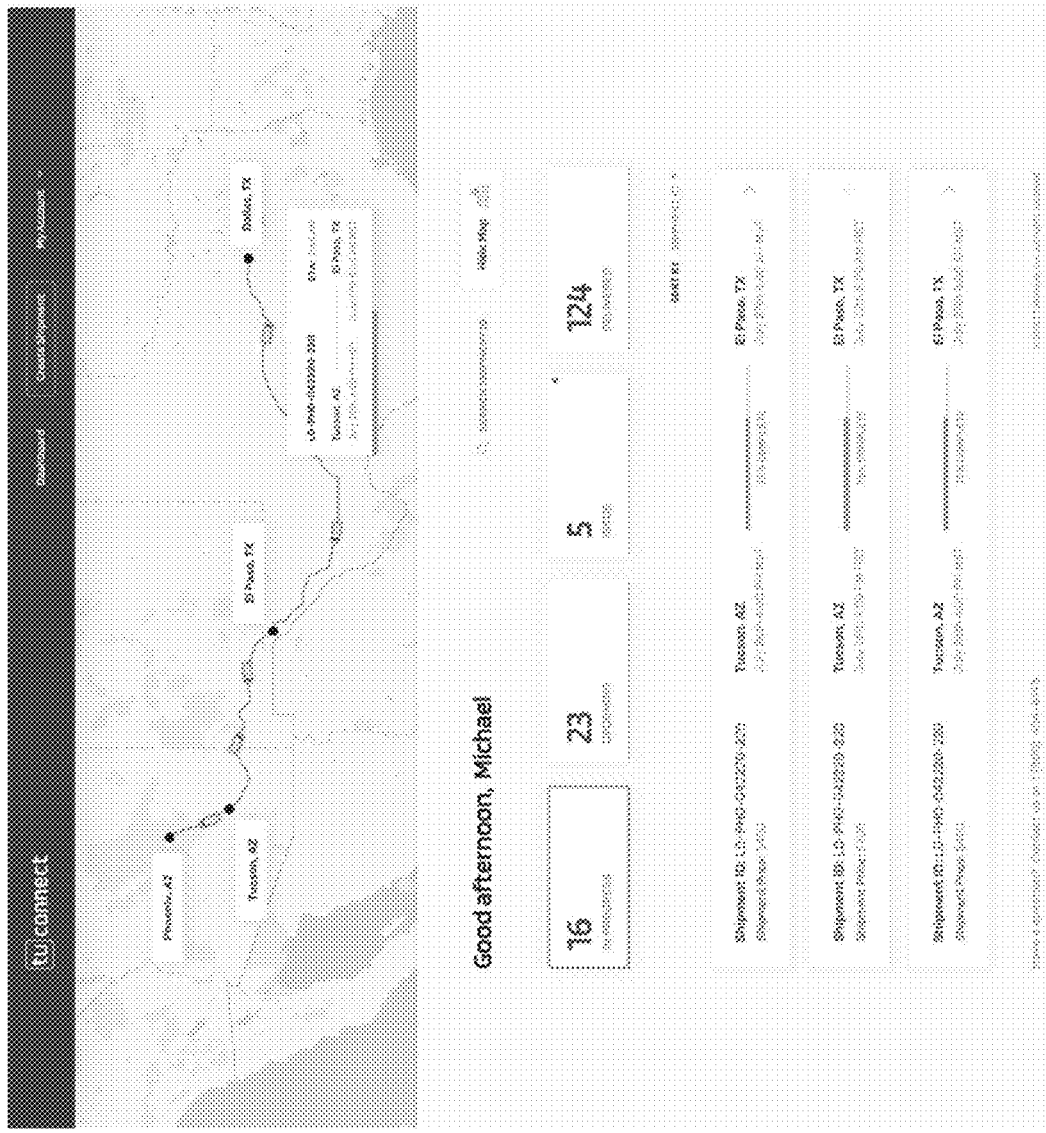
Figure 8G:
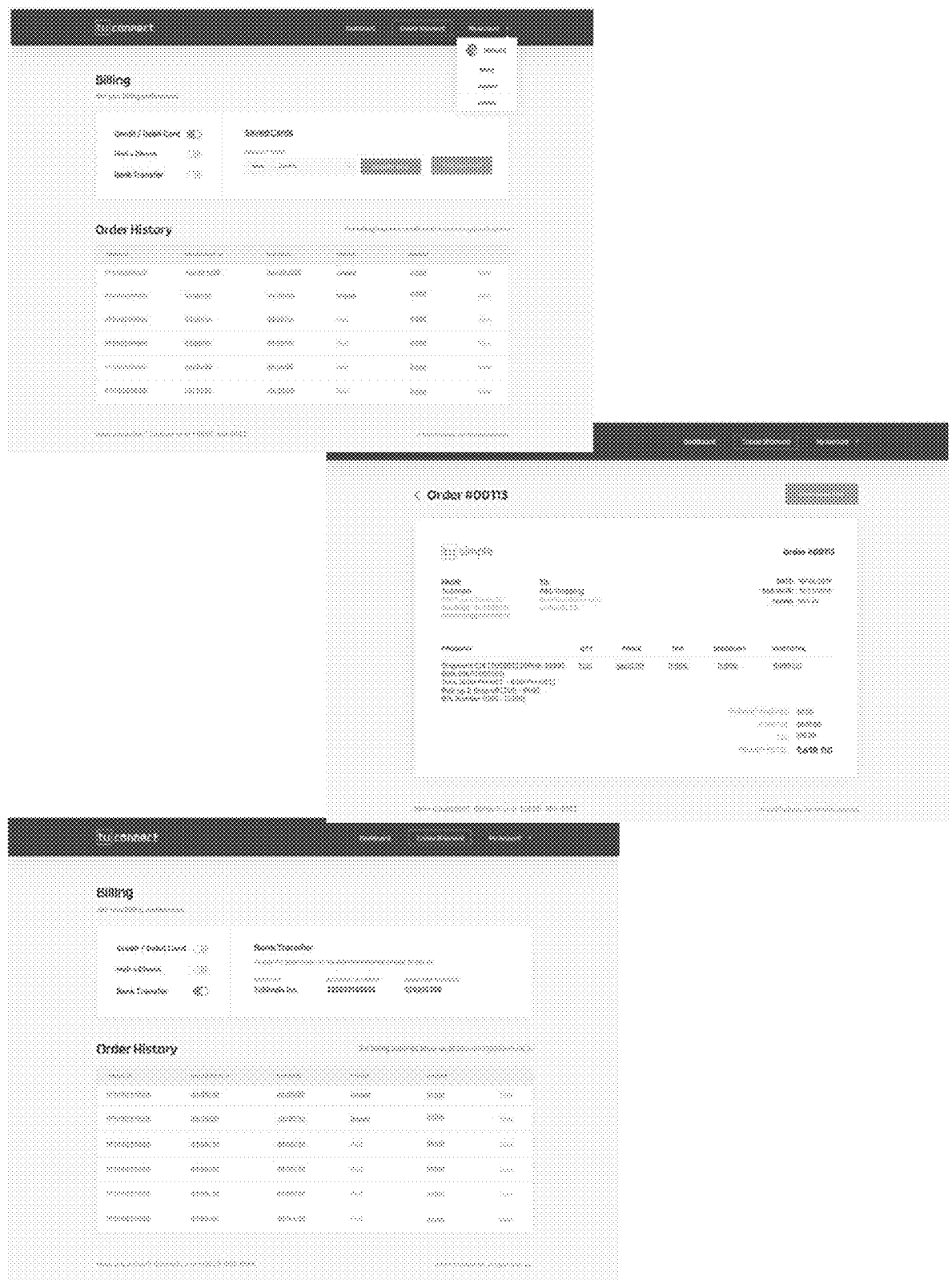
Figure 8H:
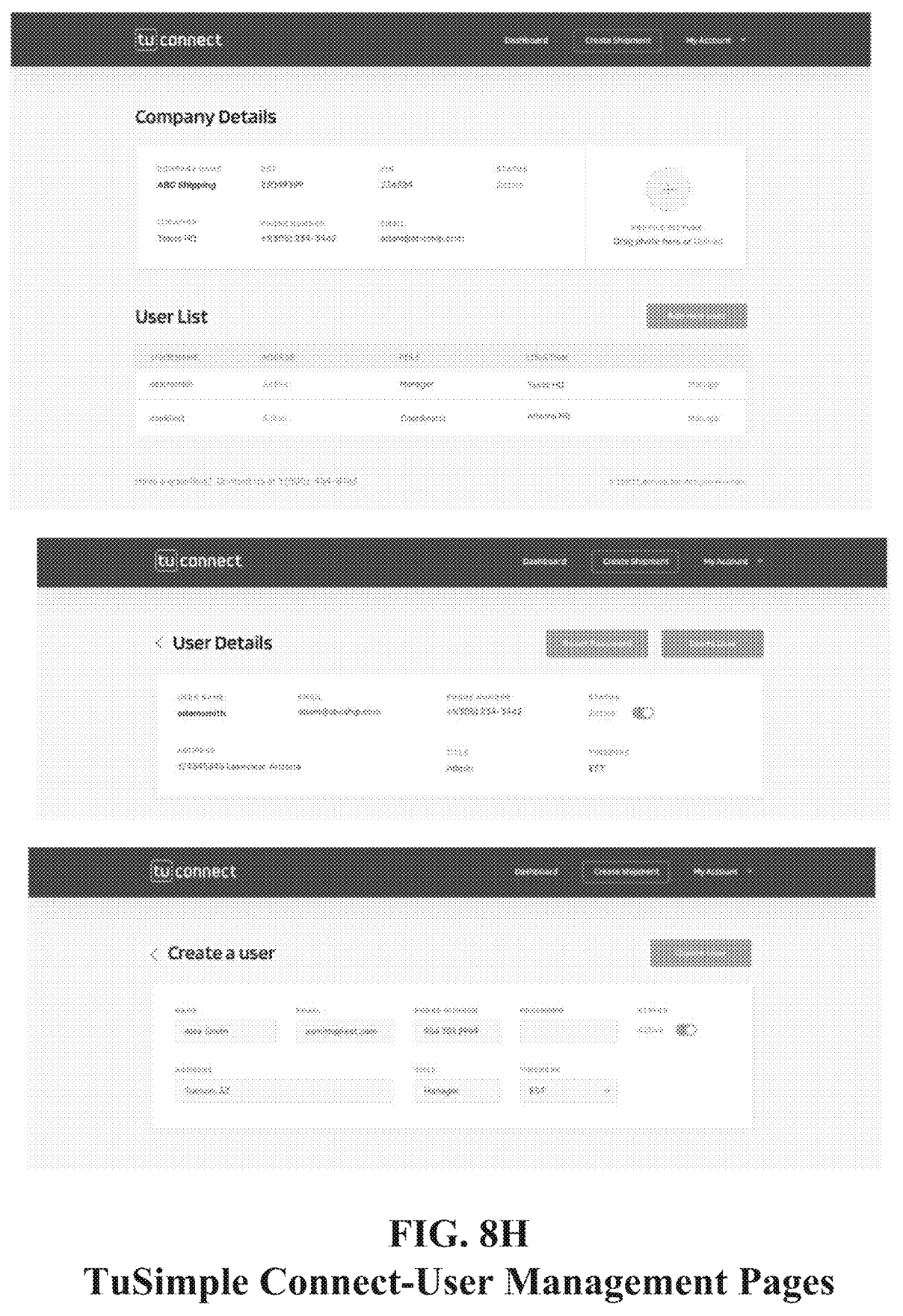

FIGS. 8A-E show examples of customer user interface pages for performing various customer operations for the customer's shipping needs on TuSimple Connect. FIG. 8A shows an example of the customer sign in page. FIG. 8B shows a user page for a customer to create a shipment request and certain information to the customer provided by TuSimple Connect (e.g., the total price for the shipment). FIG. 8C shows an example of a user page for modifying or updating the shipment. FIG. 8D shows an example of a user page for the status of a customer order of a shipment in progress, including a visual image of a map of the route between the customer-selected origination and destination shipping hub facilities, the distance, the travel time, and vehicle information. FIG. 8E shows an example of a user page listing the history and records of a customer's shipment orders on TuSimple Connect with various shipment information such as the shipment ID numbers, the origination shipping hub facilities, the destination shipping hub facilities and paid prices for the listed shipments. FIG. 8F shows an example of a user page listing the history and records of a customer's shipment orders on TuSimple Connect with a map showing additional information of the customer's shipment orders. FIG. 8G shows examples of user pages for customer billing and payment operations. FIG. 8H shows examples of user pages for user management.

Examples of Administrator Interface and Functions

TuSimple Connect also provides administrator interface pages for various administrator operations in managing and operating shipment services via TuSimple Connect. FIGS. 9A-9E show examples of administrator user interface pages for performing some administrative operations on TuSimple Connect.

Figure 9A:

FIG. 9A shows a summary of customer ordered shipments in a regional network of shipping hub facilities between Phoenix, Ariz. and Dallas, Tex. along the interstate highways I-10 and I-20. This page shows the status of the shipments such as "in progress" for deliveries in progress, "upcoming" for deliveries that have not begun, "delivered" for completed deliveries and "issue" for deliveries that are having certain technical or logistical issues to be addressed. The page contains a filter for an administrator at TuSimple Connect to sort the shipments based on various parameters such as customer names, shipment IDs, delivery truck IDs, shipping hub facility locations for customer dropoff and pickup, delivery launch times, delivery landing times, delivery status, a percentage of the completed journey to destination, etc. A hyperlinked visual map of the region network is displayed to allow the administrator to see the locations of the trucks and to enable the administrator to select a truck to launch a pop up window with detailed information for the shipment for the selected truck. TuSimple Connect allows the administrator to navigate through the hyperlinked visual map of the region network by zoom in a segment of the regional network and other navigating functions.

Figure 9B:
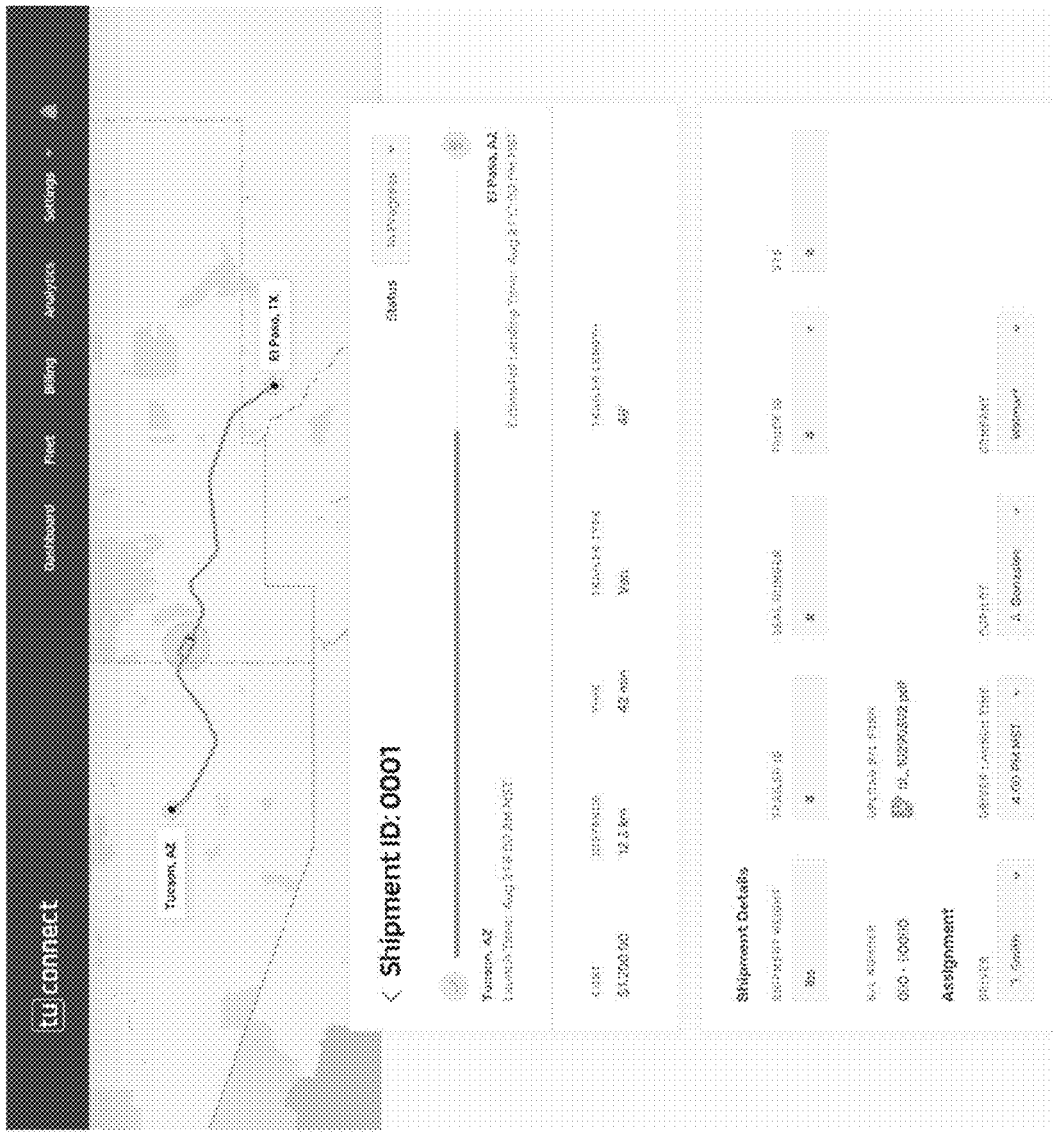
Figure 9C:
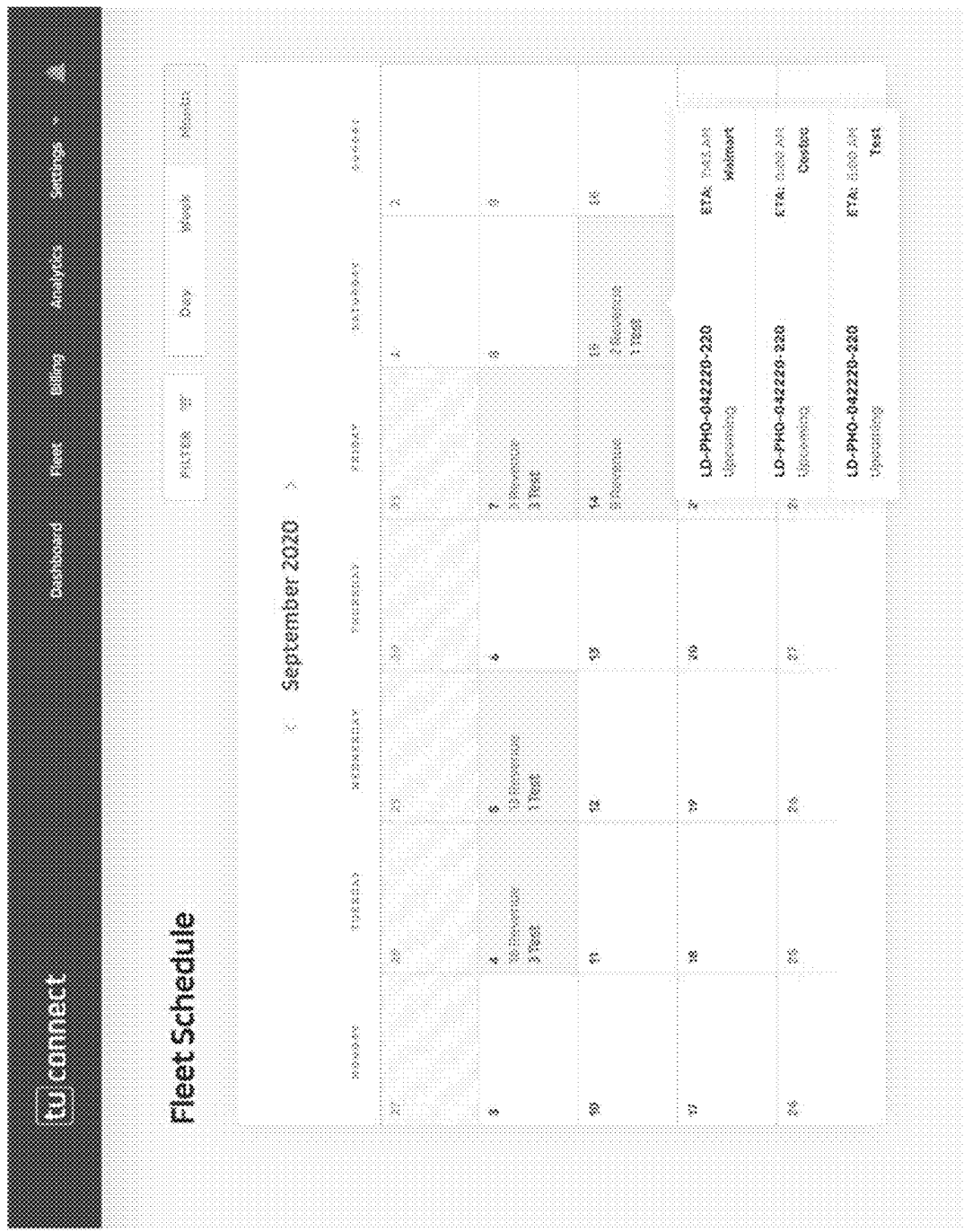
Figure 9D:
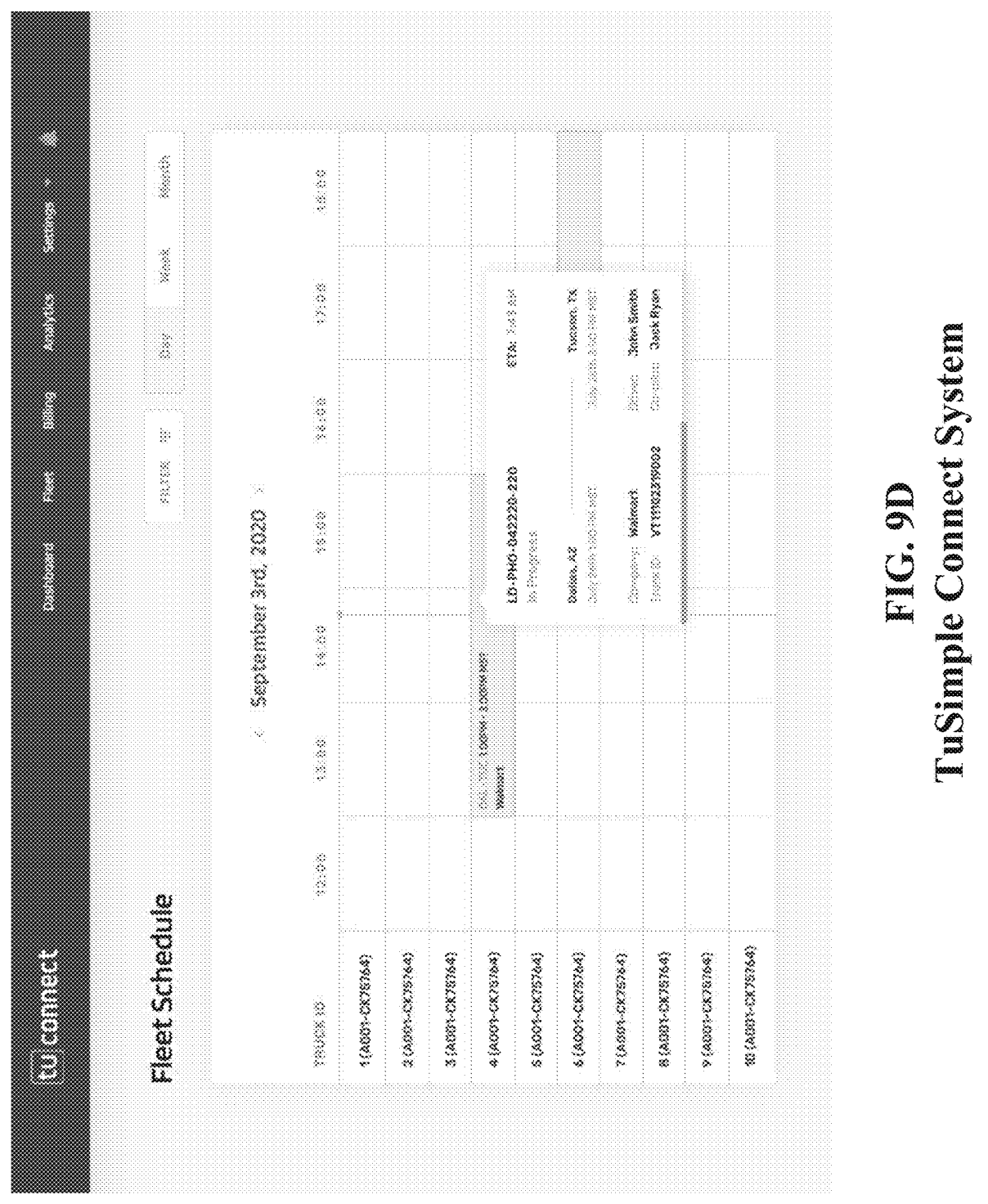
Figure 9E:
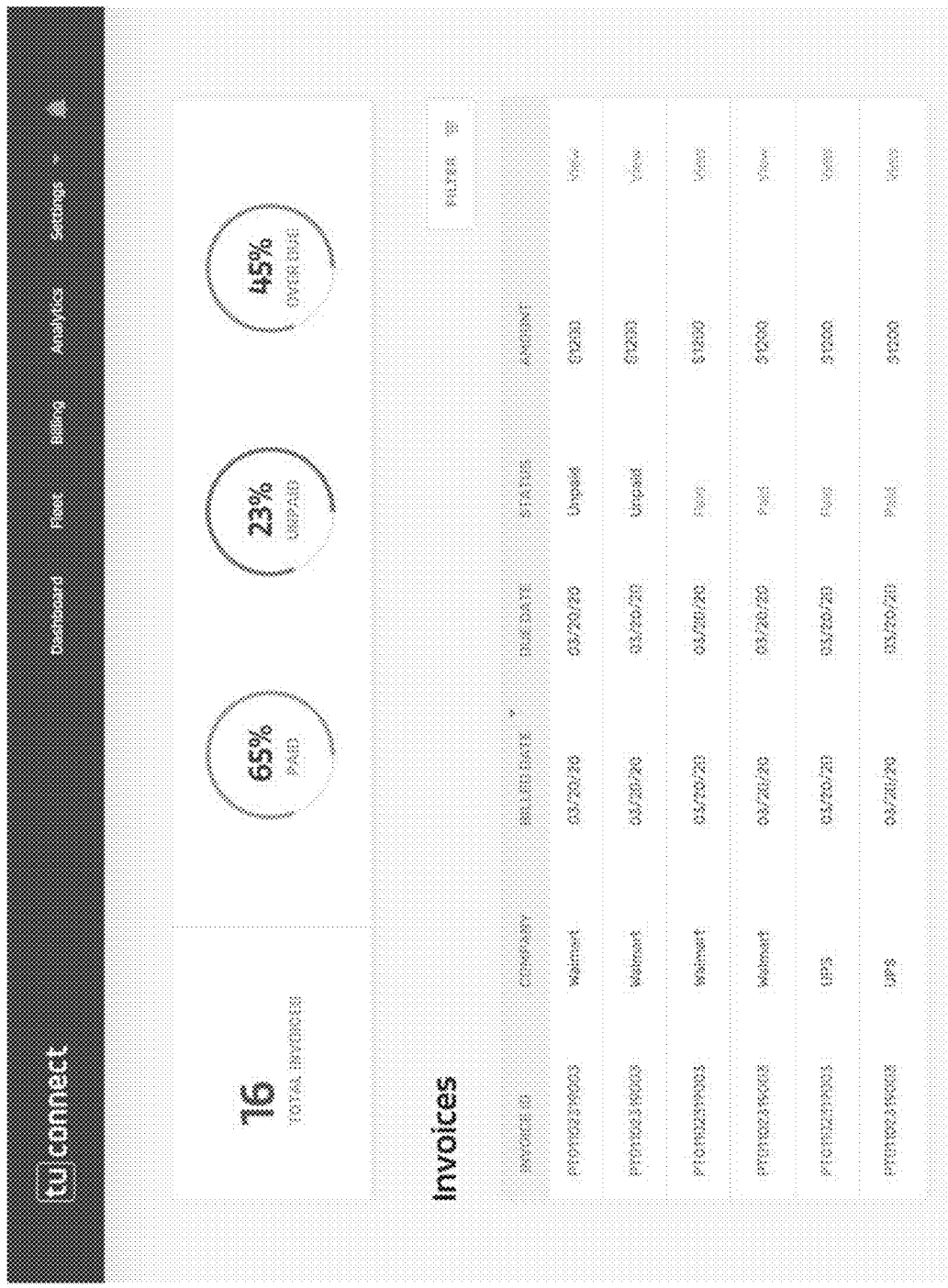

As part of the administrator user interface of TuSimple Connect, FIG. 9B shows an example of a page with status and a map for a particular shipment of interest selected by the administrator by, e.g., using the user page in FIG. 9A. This example shows some detailed information for the selected shipment, including detailed information on the shipment, the vehicle information, the on-board personnel information (e.g., names and information of the driver, the co-driver/pilot, and/or the engineer) and shipment documentation. FIG. 9C shows an example of a page with the fleet schedule for a particular month (e.g., September of 2020) in a calendar format with various display options such as daily status of the fleet, weekly status of the fleet and monthly status of the fleet or status over a longer period to provide useful information on the fleet's workload. The page allows the administrator to navigate through different periods to review details of different shipments of the fleet. FIG. 9D shows an example of the fleet schedule for a particular day of Sep. 3, 2020 that is selected by the administrator for more details on the shipments of the fleet. FIG. 9E shows yet another example of a user page for the administrator to monitor the financial information of the shipments such as a list of shipment invoices, the names of the customers, billed dates, due dates, status of payments, amounts of payments, etc. In addition, this page shows a visual summary of the total invoices and their status such as the paid, unpaid and overdue invoices.

Figure 10:
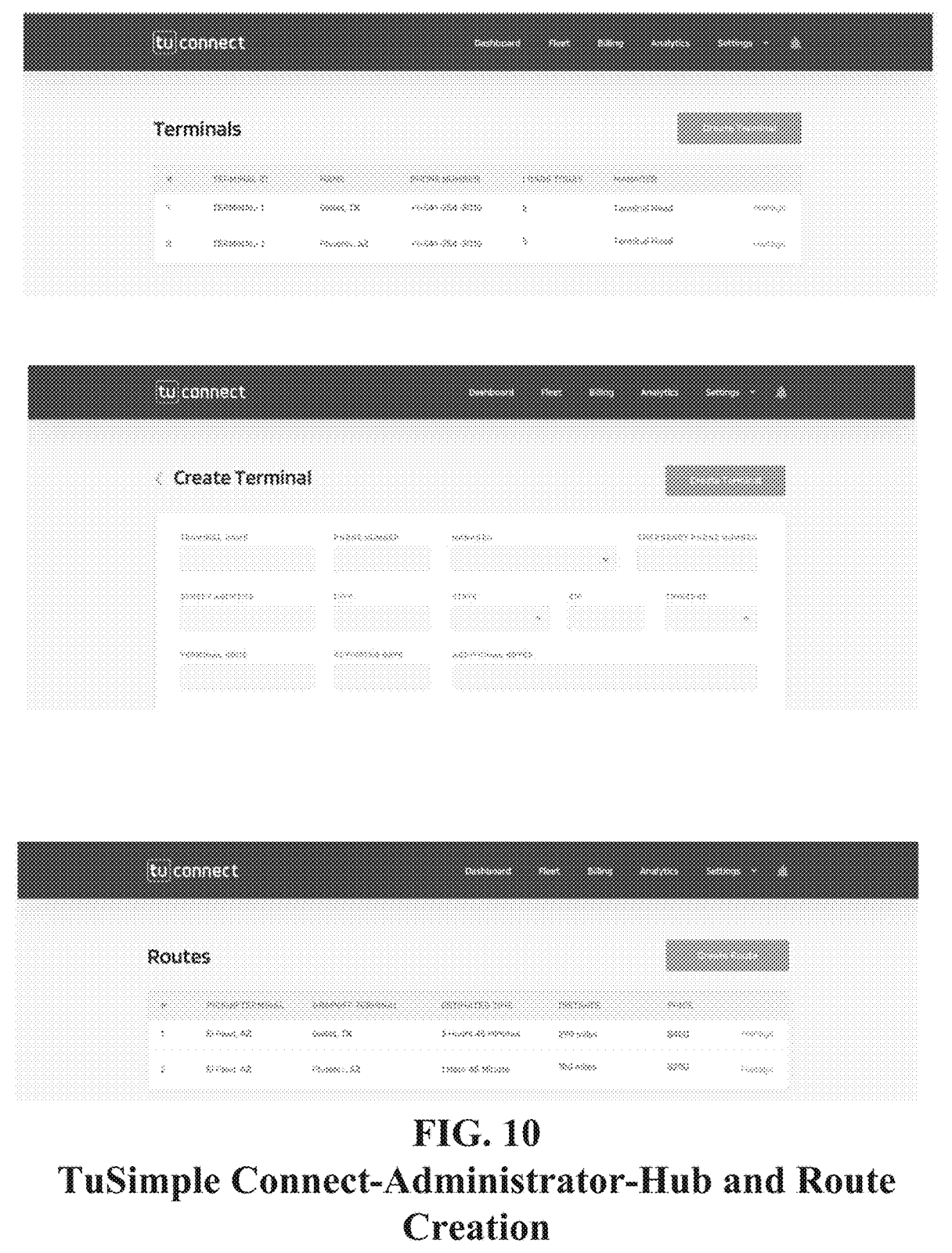
Figure 11:
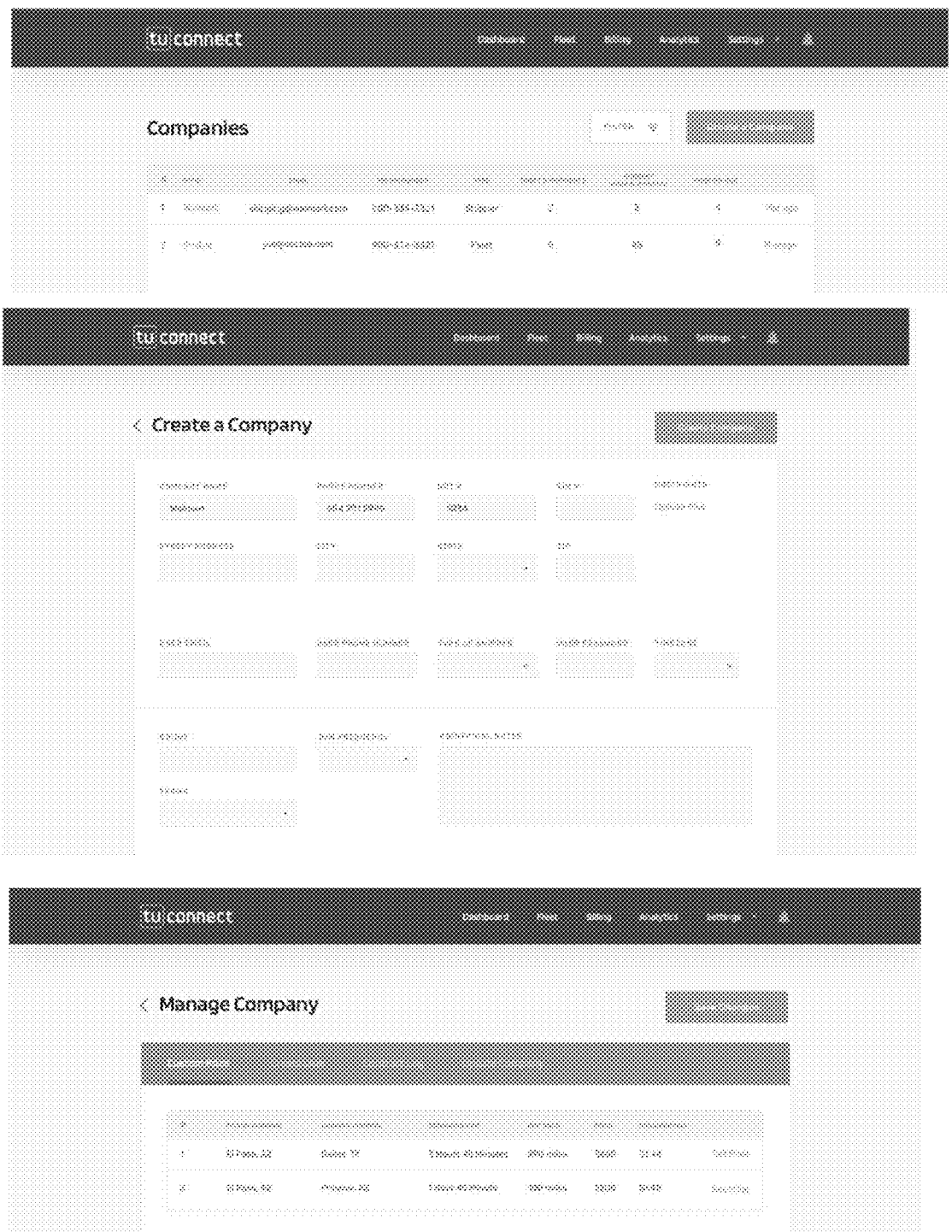

TuSimple Connect can be designed to allow an administrator to view information on shipping hub facility terminals and to create routes between shipping hub facility terminals for executing customer shipment orders. FIG. 10 shows example of three administrator user pages for viewing existing shipping hub facility terminals, adding a new shipping hub facility terminal and creating a shipment route with existing shipping hub facility terminals FIG. 11 further shows examples of administrator user pages for managing companies as shipment customers or a fleet service provider or carrier. One of the TuSimple Connect functions for managing companies is to enable an administrator to set the price to be paid to a fleet service provider or carrier.

TuSimple Connect can be designed to provide much detailed information on locations of trucks, movements of trucks, operating conditions of trucks, road conditions of the road at a truck, surroundings around a truck to enable one or more administrators and the system to analyze the truck operation in real time and to, if possible, to provide intervening commands to on-board computers in operating the trucks. For example, the administrator interface of TuSimple Connect can be configured to interact with on-board computers in self-driving trucks to receive audio and visual information associated with the real-time operation of the registered self-driving truck. Certain part of such audio or visual information fed from the truck to TuSimple Connect may be selected to feed to the user interface to allow customer to access.

TuSimple Connect Safety Inspection Protocol

As described above, one of an important features for implementing TuSimple Connect is to mandate a pre-assignment inspection for safety prior to assigning an autonomous self-driving truck to a delivery between hub facilities and only a truck that satisfactorily passes the safety inspection may be available for being assigned to a delivery. A truck that fails to pass the safety inspection is flagged in TuSimple Connect and is required by TuSimple Connect to (1) be serviced or repaired at the local shipping hub facility or another shipping hub facility with a services center and (2) subsequently pass the safety inspection prior to becoming eligible for making deliveries. This safety and inspection feature can be deployed in TuSimple Connect by an inspection protocol at on-board computers in self-driving trucks registered in TuSimple Connect to initiate an inspection procedure on safety and one or more operating conditions of registered self-driving trucks upon completing delivering goods between hub facilities or before assigning the registered self-driving truck to a next delivery assignment. Upon identification by the inspection procedure a safety or operating condition issue of a registered self-driving truck, TuSimple Connect initiates an alert to the on-board computer of the registered self-driving truck for servicing or repairing the registered self-driving truck at one of suitable shipping hub facilities. This alert may also be used to trigger scheduling of a service or repair of the registered self-driving truck at one of suitable shipping hub facilities and direct the scheduled service information to the on-board computer of the registered self-driving truck.

The above examples for various functions and operations of TuSimple Connect demonstrate the abilities for TuSimple Connect allow shipment costumers, participating fleet companies and TuSimple Connect administrators to access and manage their business on TuSimple Connect. Accordingly, the combination of the shipping hub facility terminals and TuSimple Connect provides a multi-facet platform for efficient shipping services based on autonomous self driving trucks and integration of shipment by autonomous self driving trucks and other fleet services in the network of the shipping hub facility terminals. Some examples of implementations are listed below.

Item 1. A method for using self-driving trucks and shipping hub facilities to provide a delivery service in a selected geographical region, comprising: establishing shipping hub facilities distributed at different locations in the selected geographical region to provide delivery of goods to customers in the selected geographical region, wherein each shipping hub facility includes a warehouse space for storing customer goods to be delivered to another shipping hub facility; and providing a computer system of computer servers coupled to one or more communication networks or links to (1) communicate with one another to maintain, monitor and track status of goods at the shipping hub facilities including feeding facility-specific high-definition map information and navigation data to on-board computers in self-driving trucks for navigating self-driving trucks on one or more selected and designated routes between shipping hub facilities, (2) communicate with on-board computers in self-driving trucks registered in the computer system to monitor, track and manage status and operations of registered self-driving trucks for delivering goods between the shipping hub facilities and to detect or identify one or more conditions of a registered self-driving truck suitable for being serviced or repaired at one of suitable shipping hub facilities, and (3) provide a customer interface for registered customers to access the computer system for (i) ordering, tracking and making payment for, a delivery service by one or more self-driving trucks to transport goods from one shipping hub facility to another, and (ii) accessing inventory status of goods for registered customers at one or more shipping hub facilities for delivery from one shipping hub facility to another. The status of each self-driving truck registered in the computer system includes a location in real time and a health condition of each registered self-driving truck and a status of a delivery assignment of the registered self-driving truck, and the operations of registered self-driving trucks for delivering goods between the shipping hub facilities include information on one or more assignments of each registered self-driving truck for performing one or more customer ordered deliveries, and scheduling of the one or more assignments of each registered self-driving truck for performing one or more customer ordered deliveries.

Item 2. The method as in item 1, comprising operating self-driving trucks to deliver goods for registered customers between shipping hub facilities; and providing driver-operated trucks to deliver goods for registered customers between shipping hub facilities and sites of registered customers.

Item 3. The method as in item 1, comprising configuring the customer interface for registered customers in the computer system to provide to a registered customer data and information on customer history for deliver requests, orders and payment history.

Item 4. The method as in item 1, comprising configuring the customer interface for registered customers in the computer system to provide to a registered customer a notification of a delivery ordered by the registered customer.

Item 5. The method as in item 1, comprising configuring the customer interface for registered customers in the computer system to provide to a registered customer an image or video of a self-driving truck en route to a designated shipping hub facility for delivering goods in a delivery ordered by the registered customer.

Item 6. The method as in item 1, comprising configuring the computer system to deploy and activate an inspection protocol at on-board computers in self-driving trucks registered in the computer system to initiate an inspection procedure on safety and one or more operating conditions of registered self-driving trucks before delivering goods between hub facilities.

Item 7. The method as in item 1, comprising configuring the computer system to deploy and activate an inspection protocol at on-board computers in self-driving trucks registered in the computer system to initiate an inspection procedure on safety and one or more operating conditions of registered self-driving trucks upon completing delivering goods between hub facilities.

Item 8. The method as in item 7, comprising configuring the computer system, upon identification by the inspection procedure a safety or operating condition issue of a registered self-driving truck, to initiate an alert to the on-board computer of the registered self-driving truck for servicing or repairing the registered self-driving truck at one of suitable shipping hub facilities before assigning the registered self-driving truck to a next delivery assignment.

Item 9. The method as in item 8, comprising configuring the computer system, upon initiating the alert, to schedule a service or repair of the registered self-driving truck at one of suitable shipping hub facilities and direct the scheduled service information to the on-board computer of the registered self-driving truck.

Item 10. The method as in item 1, comprising configuring the computer system to deploy and activate an inspection protocol at on-board computers in a self-driving truck registered in the computer system to initiate an inspection procedure on safety and one or more operating conditions of the registered self-driving truck before assigning the registered self-driving truck for delivering goods between hub facilities.

Item 11. The method as in item 10, comprising configuring the computer system, upon identification by the inspection procedure a safety or operating condition issue of a registered self-driving truck, to initiate an alert to the on-board computer of the registered self-driving truck for servicing or repairing the registered self-driving truck at one of suitable shipping hub facilities before assigning the registered self-driving truck to a next delivery assignment.

Item 12. The method as in item 11, comprising configuring the computer system, upon initiating the alert, to schedule a service or repair of the registered self-driving truck at one of suitable shipping hub facilities and direct the scheduled service information to the on-board computer of the registered self-driving truck.

Item 13. The method as in item 1, comprising configuring the computer system to deploy and activate a vehicle control software at on-board computers in self-driving trucks registered in the computer system to allow remote control of an operation of a registered self-driving truck in response to a condition occurred either in the registered self-driving truck or in a surrounding of the registered self-driving truck.

Item 14. The method as in item 1, comprising configuring the computer system to interact with on-board computers in self-driving trucks registered in the computer system to receive audio and visual information associated with the real-time operation of the registered self-driving truck.

Item 15. The method as in item 14, comprising configuring the computer system to select certain information of the received audio and visual information associated with the real-time operation of the registered self-driving truck to be available for a customer to access via the customer interface.

Item 16. The method as in item 1, comprising configuring the shipping hub facilities distributed at different locations in the selected geographical region to be equipped with different levels of technologies in connection with interfacing self-driving trucks.

Item 17. The method as in item 16, comprising configuring one or more of the shipping hub facilities to be equipped with in-bound and out-bound truck lanes with sensors or markers to enable self-driving trucks to autonomously navigate through in-bound and out-bound truck lanes based on operations of on-board computers and sensors on the self-driving trucks and interactions with sensors or markers of the in-bound and out-bound truck lanes.

Item 18. A computer readable medium system having code stored thereon, the code, when executed by one or more computer processors, causing the one or more computer processors to implement functions for operating self-driving trucks to provide a delivery service in a selected geographical region having shipping hub facilities distributed at different locations to provide delivery of goods to customers for the delivery service in the selected geographical region, wherein each shipping hub facility includes a warehouse space for storing customer goods to be delivered to another shipping hub facilities. The implemented functions comprise: registering self-driving trucks to be eligible for delivery of goods between the shipping hub facilities to comply with selected safety and operational requirements in a computer database stored in one or more computer servers that communicate with one another via one or more communication networks or links; tracking status of goods at the shipping hub facilities including feeding facility-specific high-definition map information and navigation data to on-board computers in registered self-driving trucks for navigating registered self-driving trucks on one or more selected and designated routes between shipping hub facilities; communicate with on-board computers in registered self-driving trucks to track and manage status and operations of registered self-driving trucks for delivering goods between the hub facilities and to detect or identify one or more conditions of a registered self-driving truck suitable for being serviced or repaired at one of suitable shipping hub facilities; and providing a customer interface for registered customers to access the computer system for (i) ordering, tracking and making payment for, a delivery service by one or more self-driving trucks to transport goods from one shipping hub facility to another, and (ii) accessing inventory status of goods for registered customers at one or more shipping hub facilities for delivery from one shipping hub facility to another.

Item 19. The computer readable medium system as in item 18, wherein the registration of self-driving trucks to be eligible for delivery of goods between the shipping hub facilities include compliance with a SAE level 1 or higher levels for autonomous vehicles by SAE International.

Item 20. The computer readable medium system as in item 18, wherein the registration of self-driving trucks to be eligible for delivery of goods between the shipping hub facilities include compliance with a SAE level 3 or higher levels for autonomous vehicles by SAE International.

Item 21. The computer readable medium system as in item 18, wherein the registration of self-driving trucks to be eligible for delivery of goods between the shipping hub facilities include compliance with a SAE level 4 or higher levels for autonomous vehicles by SAE International.

Item 22. The computer readable medium system as in item 18, wherein the status of each registered self-driving truck includes a location in real time and a health condition of each registered self-driving truck and a status of a delivery assignment of the registered self-driving truck.

Item 23. The computer readable medium system as in item 18, wherein the operations of registered self-driving trucks for delivering goods between the hub facilities include information on one or more assignments of each registered self-driving truck for performing one or more customer ordered deliveries, and scheduling of the one or more assignments of each registered self-driving truck for performing one or more customer ordered deliveries.

Item 24. The computer readable medium system as in item 18, wherein the implemented functions include deploying and operating self-driving trucks to deliver goods for registered customers between shipping hub facilities; and provide driver-operated trucks to deliver goods for registered customers between shipping hub facilities and sites of registered customers.

Item 25. The computer readable medium system as in item 18, wherein the customer interface for registered customers is configured to provide to a registered customer data and information on customer history for deliver requests, orders and payment history.

Item 26. The computer readable medium system as in item 18, wherein the customer interface for registered customers is configured to provide to a registered customer a notification of a delivery ordered by the registered customer.

Item 27. The computer readable medium system as in item 18, wherein the customer interface for registered customers is configured to provide to a registered customer an image or video of a self-driving truck en route to a designated shipping hub facility for delivering goods in a delivery ordered by the registered customer.

Item 28. The computer readable medium system as in item 18, wherein the implemented functions include deploying and activating an inspection protocol at on-board computers in registered self-driving trucks registered to initiate an inspection procedure on safety and one or more operating conditions of registered self-driving trucks before delivering goods between hub facilities.

Item 29. The computer readable medium system as in item 18, wherein the implemented functions include deploying and activating an inspection protocol at on-board computers in registered self-driving trucks to initiate an inspection procedure on safety and one or more operating conditions of registered self-driving trucks upon completing delivering goods between hub facilities.

Item 30. The computer readable medium system as in item 29, wherein the implemented functions include: upon identification by the inspection procedure a safety or operating condition issue of a registered self-driving truck, initiating an alert to the on-board computer of the registered self-driving truck for servicing or repairing the registered self-driving truck at one of suitable shipping hub facilities before assigning the registered self-driving truck to a next delivery assignment.

Item 31. The computer readable medium system as in item 30, wherein the implemented functions include, upon initiating the alert, scheduling a service or repair of the registered self-driving truck at one of suitable shipping hub facilities and direct the scheduled service information to the on-board computer of the registered self-driving truck.

Item 32. The computer readable medium system as in item 18, wherein the implemented functions include configuring the computer system to deploy and activate an inspection protocol at on-board computers in a self-driving truck registered in the computer system to initiate an inspection procedure on safety and one or more operating conditions of the registered self-driving truck before assigning the registered self-driving truck for delivering goods between hub facilities.

Item 33. The computer readable medium system as in item 32, wherein the implemented functions include, upon identification by the inspection procedure a safety or operating condition issue of a registered self-driving truck, initiating an alert to the on-board computer of the registered self-driving truck for servicing or repairing the registered self-driving truck at one of suitable shipping hub facilities before assigning the registered self-driving truck to a next delivery assignment.

Item 34. The computer readable medium system as in item 33, wherein the implemented functions include, upon initiating the alert, scheduling a service or repair of the registered self-driving truck at one of suitable shipping hub facilities and direct the scheduled service information to the on-board computer of the registered self-driving truck.

Item 35. The computer readable medium system as in item 18, wherein the implemented functions include deploying and activating a vehicle control software at on-board computers in registered self-driving trucks to allow remote control of an operation of a registered self-driving truck in response to a condition occurred either in the registered self-driving truck or in a surrounding of the registered self-driving truck.

Item 36. The computer readable medium system as in item 18, wherein the implemented functions include scheduling delivery service personnel in connection with performance by each registered self-driving truck for the one or more customer ordered deliveries, wherein the delivery service personnel includes one or more on-board persons on a registered self-driving truck during delivery.

Item 37. The computer readable medium system as in item 18, wherein the implemented functions include configuring the computer system to interact with on-board computers in self-driving trucks registered in the computer system to receive audio and visual information associated with the real-time operation of the registered self-driving truck.

Item 38. The computer readable medium system as in item 37, wherein the implemented functions include configuring the computer system to select certain information of the received audio and visual information associated with the real-time operation of the registered self-driving truck to be available for a customer to access via the customer interface.

Item 39. The computer readable medium system as in item 18, wherein the implemented functions include allowing registration of delivery trucks from a third company fleet service to be eligible for delivery of goods between the shipping hub facilities; and assigning delivery trucks from a registered third company fleet service for delivering goods between hub facilities.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is what is described and illustrated, including:

1. A method for using self-driving trucks and shipping hub facilities to provide a delivery service in a selected geographical region, comprising:
   establishing shipping hub facilities distributed at different locations in the selected geographical region to provide delivery of goods to customers in the selected geographical region, wherein each shipping hub facility includes a warehouse space for storing customer goods to be delivered to another shipping hub facility,
   wherein the shipping hub facilities distributed at different locations in the selected geographical region are structured to include a plurality of tiers respectively equipped with different levels of technology and functionalities in connection with interfacing self-driving trucks, including:

a first tier of the plurality of tiers in which each first tier shipping hub facility is equipped with in-bound and out-bound truck lanes with sensors or markers to enable a self-driving truck to autonomously navigate through the in-bound and out-bound truck lanes to respectively enter the first tier shipping hub facility from outside the first tier shipping hub facility and to exit the first tier shipping hub facility from inside the first tier shipping hub facility based on operations of on-board computers and sensors on the self-driving truck and interactions with the sensors or markers of the in-bound and out-bound truck lanes, and a second tier of the plurality of tiers in which a second tier shipping hub facility is not equipped with the in-bound and out-bound truck lanes with the sensors or markers of a first tier shipping hub facility, thus providing less functionalities for interfacing the self-driving truck;

providing a computer system of computer servers coupled to one or more communication networks or links to (1) communicate with one another to maintain, monitor and track status of goods at the shipping hub facilities including feeding facility-specific high-definition map information and navigation data to on-board computers in self-driving trucks for navigating self-driving trucks on one or more selected and designated routes between shipping hub facilities, (2) communicate with on-board computers in self-driving trucks registered in the computer system to monitor, track and manage status and operations of registered self-driving trucks for delivering goods between the shipping hub facilities and to detect or identify one or more conditions of a registered self-driving truck suitable for being serviced or repaired at one of suitable shipping hub facilities, and (3) provide a customer interface for registered customers to access the computer system for (i) ordering, tracking and making payment for, a delivery service by one or more self-driving trucks to transport goods from an origin shipping hub facility to a destination shipping hub facility, wherein the customer interface enables the registered customers to specify the origin and the destination shipping hub facilities, and (ii) accessing inventory status of goods for registered customers at one or more shipping hub facilities;

registering the self-driving trucks to be eligible for delivery of goods between the shipping hub facilities to comply with selected safety and operational requirements in a computer database stored in the computer servers that communicate with one another via the one or more communication networks or links wherein the status of each self-driving truck registered in the computer system includes a location in real time and a health condition of each registered self-driving truck and a status of a delivery assignment of the registered self-driving truck, and wherein the operations of the registered self-driving trucks for delivering goods between the shipping hub facilities include information on one or more assignments of each registered self-driving truck for performing one or more customer ordered deliveries of goods from one shipping hub facility to another shipping hub facility, and scheduling of the one or more assignments of each registered self- driving truck for performing the one or more customer ordered deliveries of goods from one shipping hub facility to another shipping hub facility;

performing the one or more customer ordered deliveries of goods from one shipping hub facility to another shipping hub facility by the registered self-driving trucks by navigating the registered self-driving trucks on the one or more selected and designated routes between shipping hub facilities using the navigation data fed to the on-board computers of the registered self-driving trucks, wherein the registered self-driving trucks that perform the one or more customer ordered deliveries of goods from one shipping hub facility to another shipping hub facility with at least one first tier shipping hub facility are configured and enabled to autonomously navigate through the in-bound and out-bound truck lanes based on the information from the sensors or markers equipped in the in-bound and out-bound truck lanes to enable a registered self-driving truck to autonomously navigate through the in-bound and out-bound truck lanes;

allowing registration of delivery trucks from a third party company trucking fleet service in the computer system to be eligible for delivery of goods between the shipping hub facilities that would otherwise be carried out only by the registered self-driving trucks without using the delivery trucks from the third party company trucking fleet service, wherein the registration of the delivery trucks of the third party company trucking fleet service enables customers of the third party company trucking fleet service to use the customer interface provided for registered customers of the delivery service by the one or more self-driving trucks;

assigning the registered delivery trucks from the third party company trucking fleet service for delivering goods between shipping hub facilities to supplement performance of customer-ordered transportation of goods between shipping hub facilities that would otherwise be performed only by registered self-driving trucks;

rendering the registered self-driving trucks available for delivering goods between shipping hub facilities as part of performance of a delivery service by the third party company trucking fleet service that would otherwise be performed by delivery trucks of the third party company trucking fleet service without using the shipping hub facilities and any of the registered self-driving trucks; and assigning an available registered self-driving truck to deliver goods between shipping hub facilities as part of performance of the delivery service by the third party company trucking fleet service that would otherwise be performed by delivery trucks of the third party company trucking fleet service without using the shipping hub facilities and the registered self-driving trucks.

2. The method as in claim 1, comprising:

operating self-driving trucks to deliver goods for registered customers between shipping hub facilities; and providing driver-operated trucks to deliver goods for registered customers between shipping hub facilities and sites of registered customers.

3. The method as in claim 1, comprising:

configuring the computer system to deploy and activate an inspection protocol at on-board computers in a self-driving truck registered in the computer system to initiate an inspection procedure on safety and one or more operating conditions of the registered self-driving truck before assigning the registered self-driving truck for delivering goods between hub facilities.

4. The method as in claim 3, comprising:
configuring the computer system, upon identification by the inspection procedure a safety or operating condition issue of a registered self-driving truck, to initiate an alert to the on-board computer of the registered self-driving truck for servicing or repairing the registered self-driving truck at one of suitable shipping hub facilities before assigning the registered self-driving truck to a next delivery assignment.

5. The method as in claim 4, comprising:
configuring the computer system, upon initiating the alert, to schedule a service or repair of the registered self-driving truck at one of the suitable shipping hub facilities and direct the scheduled service information to the on-board computer of the registered self-driving truck.

6. The method as in claim 1, comprising:
configuring the computer system to interact with on-board computers in self-driving trucks registered in the computer system to receive audio and visual information associated with real-time operation of the registered self-driving truck.

7. The method as in claim 6, comprising:
configuring the computer system to select certain information of the received audio and visual information associated with the real-time operation of the registered self-driving truck to be available for a customer to access via the customer interface.

8. A non-transitory computer readable medium system having code stored thereon, the code, when executed by one or more computer processors, causing the one or more computer processors to implement functions for operating self-driving trucks to provide a delivery service in a selected geographical region having shipping hub facilities distributed at different locations to provide delivery of goods to customers for the delivery service in the selected geographical region, wherein each shipping hub facility includes a warehouse space for storing customer goods to be delivered to another shipping hub facility,
wherein the shipping hub facilities distributed at different locations in the selected geographical region are structured to include a plurality of tiers respectively equipped with different levels of technology and functionalities in connection with interfacing self-driving trucks, including:
a first tier of the plurality of tiers in which each first tier shipping hub facility is equipped with in-bound and out-bound truck lanes with sensors or markers to enable a self-driving truck to autonomously navigate through the in-bound and out-bound truck lanes to respectively enter the first tier shipping hub facility from outside the first tier shipping hub facility and to exit the first tier shipping hub facility from inside the first tier shipping hub facility based on operations of on-board computers and sensors on the self-driving truck and interactions with the sensors or markers of the in-bound and out-bound truck lanes, and
a second tier of the plurality of tiers in which a second tier shipping hub facility is not equipped with the in-bound and out-bound truck lanes with the sensors or markers of a first tier shipping hub facility, thus providing less functionalities for interfacing the self-driving truck, and wherein the implemented functions comprise:

registering self-driving trucks to be eligible for delivery of goods between the shipping hub facilities to comply with selected safety and operational requirements in a computer database stored in one or more computer servers that communicate with one another via one or more communication networks or links;
tracking status of goods at the shipping hub facilities including feeding facility-specific high-definition map information and navigation data to on-board computers in registered self-driving trucks for navigating registered self-driving trucks on one or more selected and designated routes between shipping hub facilities;
communicating with on-board computers in registered self-driving trucks to track and manage status and operations of registered self-driving trucks for delivering goods between the shipping hub facilities and to detect or identify one or more conditions of a registered self-driving truck suitable for being serviced or repaired at one of suitable shipping hub facilities;
providing a customer interface for registered customers to access a computer system for (i) ordering, tracking and making payment for, a delivery service by one or more self-driving trucks to transport goods from an origin shipping hub facility to a destination shipping hub facility, wherein the customer interface enables the registered customers to specify the origin and the destination shipping hub facilities, and (ii) accessing inventory status of goods for registered customers at one or more shipping hub facilities,
wherein the status of each self-driving truck registered in the computer system includes a location in real time and a health condition of each registered self-driving truck and a status of a delivery assignment of the registered self-driving truck, and
wherein the operations of registered self-driving trucks for delivering goods between the shipping hub facilities include information on one or more assignments of each registered self-driving truck for performing one or more customer ordered deliveries of goods from one shipping hub facility to another shipping hub facility, and scheduling of the one or more assignments of each registered self-driving truck for performing the one or more customer ordered deliveries of goods from one shipping hub facility to another shipping hub facility;
performing delivery of goods from one shipping hub facility to another shipping hub facility by the registered self-driving trucks by navigating the registered self-driving trucks on the one or more selected and designated routes between shipping hub facilities using the navigation data fed to the on-board computers in the registered self-driving trucks,
wherein the registered self-driving trucks that perform the one or more customer ordered deliveries of goods from one shipping hub facility to another shipping hub facility with at least one first tier shipping hub facility are configured and enabled to autonomously navigate through the in-bound and out-bound truck lanes based on the information from the sensors or markers equipped in the in-bound and out-bound truck lanes to enable a registered self-driving truck to autonomously navigate through the in-bound and out-bound truck lanes;
allowing registration of delivery trucks from a third party company trucking fleet service in the computer database to be eligible for delivery of goods between the shipping hub facilities that would otherwise be carried out only by the registered self-driving trucks without using the delivery trucks from the third party company trucking fleet service, wherein the registration of the delivery trucks of the third party company trucking fleet service enables customers of the third party company trucking fleet service to use the customer interface provided for registered customers of the delivery service by the one or more self-driving trucks;

assigning the registered delivery trucks from the third party company trucking fleet service for delivering goods between shipping hub facilities to supplement performance of customer-ordered transportation of goods between shipping hub facilities that would otherwise be performed only by registered self-driving trucks;

rendering the registered self-driving trucks available for delivering goods between shipping hub facilities as part of performance of a delivery service by the third party company trucking fleet service that would otherwise be performed by delivery trucks of the third party company trucking fleet service without using the shipping hub facilities and any of the registered self-driving trucks; and assigning an available registered self-driving truck to deliver goods between shipping hub facilities as part of performance of the delivery service by the third party company trucking fleet service that would otherwise be performed by delivery trucks of the third party company trucking fleet service without using the shipping hub facilities and the registered self-driving trucks.

9. The non-transitory computer readable medium system as in claim 8, wherein the registration of self-driving trucks to be eligible for delivery of goods between the shipping hub facilities include compliance with a SAE level 1 or higher levels for autonomous vehicles by SAE International.

10. The non-transitory computer readable medium system as in claim 8, wherein the registration of self-driving trucks to be eligible for delivery of goods between the shipping hub facilities include compliance with a SAE level 3 or higher levels for autonomous vehicles by SAE International.

11. The non-transitory computer readable medium system as in claim 8, wherein the registration of self-driving trucks to be eligible for delivery of goods between the shipping hub facilities include compliance with a SAE level 4 or higher levels for autonomous vehicles by SAE International.

12. The non-transitory computer readable medium system as in claim 8, wherein the implemented functions include:
configuring the computer system to deploy and activate an inspection protocol at on-board computers in a self-driving truck registered in the computer system to initiate an inspection procedure on safety and one or more operating conditions of the registered self-driving truck before assigning the registered self-driving truck for delivering goods between hub facilities.

13. The non-transitory computer readable medium system as in claim 12, wherein the implemented functions include:
upon identification by the inspection procedure a safety or operating condition issue of a registered self-driving truck, initiating an alert to the on-board computer of the registered self-driving truck for servicing or repairing the registered self-driving truck at one of suitable shipping hub facilities before assigning the registered self-driving truck to a next delivery assignment.

14. The non-transitory computer readable medium system as in claim 8, wherein the implemented functions include:
deploying and activating a vehicle control software at on-board computers in registered self-driving trucks to allow remote control of an operation of a registered self-driving truck in response to a condition occurring in the registered self-driving truck or a condition occurring in a surrounding of the registered self-driving truck.

15. The method of claim 1, wherein each first tier shipping hub facility is further equipped with optical character recognition capacity configured to acquire information from self-driving trucks autonomously entering and exiting the shipping hub facility through the in-bound and out-bound truck lanes.

16. The method of claim 1, wherein the plurality of tiers further includes a third tier of shipping hub facilities configured with less functionality for interfacing self-driving trucks than the first tier and the second tier shipping hub facilities, and wherein a third tier shipping hub facility is equipped with a truck service center.

17. The non-transitory computer readable medium of claim 8, wherein a distance between the one shipping hub facility and the another shipping hub facility is at least the distance between Phoenix, Ariz. and Tucson, Ariz.

\* \* \* \* \*